United States Patent
Kakaraparthi et al.

(10) Patent No.: US 12,547,653 B1
(45) Date of Patent: Feb. 10, 2026

(54) METHOD AND SYSTEM FOR IDENTIFYING DOMAIN-SPECIFIC SERVICE MANAGEMENT HOTSPOTS

(71) Applicant: Wipro Limited, Bangalore (IN)

(72) Inventors: Narasimha Sekhar Kakaraparthi, Hyderabad (IN); Rajeev Ranjan Kumar, Hyderabad (IN); Seshu Kumar G V, Hyderabad (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 18/948,835

(22) Filed: Nov. 15, 2024

(30) Foreign Application Priority Data

Aug. 6, 2024 (IN) .............................. 202441059380

(51) Int. Cl.
*G06F 16/00* (2019.01)
*G06F 16/35* (2019.01)
*G06F 40/284* (2020.01)

(52) U.S. Cl.
CPC ............ *G06F 16/35* (2019.01); *G06F 40/284* (2020.01)

(58) Field of Classification Search
None
See application file for complete search history.

(56) References Cited

U.S. PATENT DOCUMENTS

| | | |
|---|---|---|
| 10,977,293 B2 | 4/2021 | Cai et al. |
| 11,822,424 B2 | 11/2023 | Ni et al. |
| 11,836,037 B2 | 12/2023 | Saha et al. |
| 11,855,860 B1 | 12/2023 | Kumar et al. |
| 12,309,185 B1 * | 5/2025 | Skarphedinsson .... H04L 67/535 |
| 2019/0130415 A1 * | 5/2019 | Cheah ..................... G06Q 10/04 |

(Continued)

FOREIGN PATENT DOCUMENTS

| | | |
|---|---|---|
| EP | 3926891 B1 | 12/2021 |
| KR | 10-2295868 B1 | 9/2021 |

OTHER PUBLICATIONS

Cheng et al., "AI for IT Operations (AIOps) on Cloud Platforms: Reviews, Opportunities and Challenges", ArXiv (Cornell University Online Library), arXiv:2304.04661v1 [cs.LG], XP091480757, Apr. 10, 2023, 34 pages.

(Continued)

*Primary Examiner* — Anhtai V Tran
(74) *Attorney, Agent, or Firm* — Finnegan, Henderson, Farabow, Garrett & Dunner, LLP

(57) ABSTRACT

This disclosure relates to method and causal analysis server for identifying domain-specific service management hotspots. The method includes receiving raw data corresponding to plurality of domain-specific issues; generating plurality of chunks from the raw data using an optimal chunking and tokenizing algorithm selected from chunking and tokenizing algorithms to obtain chunked data; creating a plurality of embeddings from the chunked data through an embedding model; clustering the plurality of embeddings into a set of clusters and a set of sub-clusters associated with each of the set of clusters, based on a similarity analysis; determining a set of cluster labels corresponding to the set of clusters and a set of sub-cluster labels corresponding to the set of sub-clusters, via a Large Language Model (LLM); and identifying a plurality of hotspots corresponding to the plurality of domain-specific issues based on the set of cluster labels and the set of sub-cluster labels.

18 Claims, 18 Drawing Sheets

(56) References Cited

U.S. PATENT DOCUMENTS

2025/0005175 A1\* 1/2025 Sumedrea ............ G06F 21/6254
2025/0053587 A1\* 2/2025 Coulter ................. G06F 16/367

OTHER PUBLICATIONS

Extended European Search Report in European Application No. 25154823.6, dated Jul. 30, 2025, 9 pages.
Annina Liessmann et al., "Predicting Customer Satisfaction in Service Processes Using Multilingual Large Language Models", Proc. of HICSS-57, https://hdl.handle.net/10125/106566, 10 pages, (2024).
Yuxuan Jiang et al., "XPERT: Empowering Incident Management with Query Recommendations via Large Language Models", Microsoft Research Asia, arXiv:2312.11988v1 [cs.SE], 13 pages, (2023).
Harshad Borgaonkar, "The Application of Large Language Models in Service Management", BMC Blogs, www.bmc.com/blogs/large-language-models-in-service-management/, 3 pages, (2023).
Asraa Mohammed Albeshr, "A Smart Chatbot System for Digitizing Service Management to Improve Business Continuity", Theses, vol. 1114, https://scholarworks.uaeu.ac.ae/all_theses/1114, 84 pages, (2023).
Roy Atkinson, "AITSM—the next Evolution in ITSM", Rezolve.ai, www.rezolve.ai/blog/aitsm-the-next-evolution-in-itsm, 21 pages, (2023).

\* cited by examiner

| Field | Mandatory for the analysis | Details |
|---|---|---|
| Title | Yes | Short title of the issue |
| Description | Yes | Details of the issue, work notes entered by the Subject Matter Experts (SMEs) who worked on the ticket. This contains observations, evaluations, discussion summaries, test results etc., This also includes closure remarks with short description of the fix/resolution provided. This description may contain images also |
| Created Datetime | Yes | Date & time of the ticket creation |
| Closed Datetime | Yes | Date & time of the ticket closure |
| Priority | Yes | Issue resolution urgency based on business criticality |
| Impact | Yes | Impact of the issue, based on the impacted users, groups, or departments |
| Reassienment Count | No | This count indicates number of hops from one resolution group to another group among IT departments |
| Reopen. Count | No | This count indicates number of times ticket is reopened due to reoccurrence or in-adequate resolution |
| Location | No | Location of the impacted user |
| Type | No | Indicates top level classification indicated by ticket initiator. Typical examples are network, storage, data center, VDI etc. |
| Assignment Group | No | Indicates the group assigned for providing resolution |
| Configuration Item | No | Details of the IT infrastructure component where issue is observed |

FIG. 5

| No. | Title | Description | Created Datetime | Closed Datetime | Priority | Impact |
|---|---|---|---|---|---|---|
| 0 | Struggling with sluggish file retrieval from the central storage hub due to congested network traffic. | The system's CPU usage is consistently high, and the disk activity is excessive | 03/12/2023 10:34:40 AM | 05/12/2023 10:34:40 AM | 3 | Individual |
| 1 | Observed that numerous crucial documents have vanished from a communal folder. | The communal folder is "D:Data". This shared drive is accessible for all the users within our department | 20/11/2023 10:34:40 AM | 23/11/2023 10:34:40 AM | 1 | organization |
| 2 | Alert received: SAN storage running out of space, urgent action required to prevent data loss. | Step 1: Verify Alert and Severity Level – Check the severity level of the alert (e.g., critical, warning) and verify if it's a false positive or genuine issue.... | 13/12/2023 10:34:40 AM | 16/12/2023 10:34:40 AM | 2 | wing |
| 3 | Generate according to: Experiencing slow data transfer rates when accessing files on the network share. | Error message received: "Access Denied" when attempting to access shared folders. Unable to open the PDF file. Error message received: "File Format Not Supported" when attempting to open the document.... | 29/11/2023 10:34:40 AM | 01/12/2023 10:34:40 AM | 3 | team |

FIG. 6

| Field | Details |
|---|---|
| Server Name | This is name of the server for identification |
| Hostname | Hostname is a label to a device connected to a computer network. Helps to identify the device in various forms of electronic communication |
| SLA | Service level agreement (SLA) is a contract between service provider and customer |
| Environment | Type of deployment or usage of the server like production or test usage and deployment |
| Platform Version | Operating system and version on which server is running |
| Segment | Area or region where server is located |

FIG. 7

| | Server Name | Hostname | SLA | Environment | Platform Version | Segment |
|---|---|---|---|---|---|---|
| 0 | r0953 | r0953.xxx.com | Normal | Production | Ubuntu 22.02 | Country 1 |
| 1 | ger0289 | ger0289.yyy.com | Normal | Production | RHEL 8 | Country 2 |
| 2 | ger0970 | ger0970.zzz.com | Basic | Test | SLES 10 | Country 3 |
| 3 | cgf0660 | cgf0660.aaa.com | Normal | Production | Window 7 | Country 4 |
| ... | ... | ... | ... | ... | ... | ... |

| Main Clusters (Topics) | Sub Clusters (Sub-topics) | Count | Affected CMDB Servers |
|---|---|---|---|
| 1_Power_Network_disruptions | Corruption and Delay | 366 | server_121 |
| 11_network_file_slow_response | Slow file retrieval from remote storage | 229 | server_356 |
| 11_network_file_slow_response | Vanished critical files from network drive | 193 | server_451 |
| 11_network_file_slow_response | Remote connectivity issues with designated devices | 180 | server_451 |
| 2_power_failure | Power supply instability in data center | 164 | server_80 |
| 11_network_file_slow_response | Network Storage Retrieval Errors | 161 | server_150 |
| 9_restrictions_security | Antivirus restrictions on modifying registry keys | 140 | server_210 |

FIG. 11

| Topic | Sub-topic | Count | Affected CMDB Servers |
|---|---|---|---|
| Power disruptions | Network Packet Corruption and Delay | 366 | server_121 |
| Network latency | Slow file retrieval from remote storage | 229 | server_356 |
| Network latency | Vanished critical files from network drive | 193 | server_451 |
| Network latency | Remote connectivity issues with designated devices | 180 | server_451 |
| Power disruptions | Power supply instability in data center | 164 | server_80 |
| Network latency | Network Storage Retrieval Errors | 161 | server_150 |
| Antivirus restrictions | Antivirus restrictions on modifying registry keys | 140 | server_210 |
| Remote storage sluggishness | Network Storage Device Retrieval Error | 161 | server_150 |
| Remote storage sluggishness | NAS Low Disk Space Alert | 114 | server_451 |
| ... | ... | ... | ... |

| Mapped Name | Real Name of the servers from the ticket |
|---|---|
| server_121 | s01c01 |
| server_356 | s01b09 |
| server_80 | s01b11 |
| server_451 | s01b01 |
| server_150 | s01a01 |
| server_210 | s01a15 |
| ... | ... |

FIG. 14

METHOD AND SYSTEM FOR IDENTIFYING DOMAIN-SPECIFIC SERVICE MANAGEMENT HOTSPOTS

TECHNICAL FIELD

This disclosure relates generally to enterprise Information Technology (IT) infrastructures, and more particularly to system and method for identifying service management hotspots in IT infrastructures.

BACKGROUND

In modern scenario of enterprise operations, efficient functioning of an enterprise may depend upon seamless management of services that may support Information Technology (IT) infrastructure and applications of the enterprise. IT service management systems may be inundated with a significant volume of requests and incidents related to a wide variety of issues on a regular basis. Sheer volume and diversity of these issues may overwhelm IT teams responsible for managing the IT service management systems.

Difficulty in identifying critical issues among the multitude of incoming requests and incidents is a significant challenge for the IT teams. The IT teams may struggle in prioritizing the critical issues, which may result in delay in addressing the critical issues, leading to disruptions in business operations and potential losses in productivity and revenue. Moreover, due to lack of a structured framework, the IT teams may often find themselves reactive rather than proactive, responding to issues as they arise. Without a systematic approach to monitoring and analyzing the IT infrastructure, timely detection of emerging issues may be challenging.

Due to absence of a proactive framework, the IT teams may miss opportunities to identify and mitigate hotspots (i.e., areas of the IT infrastructure or applications that are prone to recurrent issues or are at a higher risk of failure) within the enterprise IT estate. Proactive identification of the hotspots may enable the IT teams to implement preventive measures to strengthen resilience and reliability of the IT infrastructure of the enterprise, thereby minimizing the occurrence of disruptions and improving overall service quality.

Thus, the present invention is directed to overcome one or more limitations stated above or any other limitations associated with the known arts.

SUMMARY

In one embodiment, a method of identifying domain-specific service management hotspots is disclosed. In one example, the method may include receiving raw data corresponding to a plurality of domain-specific issues. The raw data may include at least one of image data and text data. The method may further include generating a plurality of chunks from the raw data using an optimal chunking and tokenizing algorithm selected from a set of chunking and tokenizing algorithms to obtain chunked data. The method may further include creating a plurality of embeddings from the chunked data through an embedding model. The method may further include clustering the plurality of embeddings into a set of clusters and a set of sub-clusters associated with each of the set of clusters, based on a similarity analysis. The method may further include determining a set of cluster labels corresponding to the set of clusters and a set of sub-cluster labels corresponding to the set of sub-clusters associated with each of the set of clusters, via a Large Language Model (LLM). The set of cluster labels and the set of sub-cluster labels are in natural language. The method may further include identifying a plurality of hotspots corresponding to the plurality of domain-specific issues based on the set of cluster labels and the set of sub-cluster labels.

In one embodiment, a system for identifying domain-specific service management hotspots is disclosed. In one example, the system may include a processor and a computer-readable medium communicatively coupled to the processor. The computer-readable medium may store processor-executable instructions, which, on execution, may cause the processor to receive raw data corresponding to a plurality of domain-specific issues. The raw data may include at least one of image data and text data. The processor-executable instructions, on execution, may further cause the processor to generate a plurality of chunks from the raw data using an optimal chunking and tokenizing algorithm selected from a set of chunking and tokenizing algorithms to obtain chunked data. The processor-executable instructions, on execution, may further cause the processor to create a plurality of embeddings from the chunked data through an embedding model. The processor-executable instructions, on execution, may further cause the processor to cluster the plurality of embeddings into a set of clusters and a set of sub-clusters associated with each of the set of clusters, based on a similarity analysis. The processor-executable instructions, on execution, may further cause the processor to determine a set of cluster labels corresponding to the set of clusters and a set of sub-cluster labels corresponding to the set of sub-clusters associated with each of the set of clusters, via a Large Language Model (LLM). The set of cluster labels and the set of sub-cluster labels are in natural language. The processor-executable instructions, on execution, may further cause the processor to identify a plurality of hotspots corresponding to the plurality of domain-specific issues based on the set of cluster labels and the set of sub-cluster labels.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 is a table representing parameters corresponding to ticket dump data, in accordance with some embodiments.

FIG. 6 is a table representing exemplary ticket dump data, in accordance with an embodiment.

FIG. 7 is a table representing parameters corresponding to Configuration Management Database (CMDB) data, in accordance with some embodiments.

FIG. 8 is a table representing exemplary CMDB data, in accordance with an embodiment.

FIG. 11 a table representing output of the clustering unit, in accordance with an embodiment.

FIG. 13 is a table representing corresponding to the topics and the labels corresponding to the sub-topics, in accordance with an embodiment.

FIG. 14 is a table representing data fetched from the fourth data storage, in accordance with an embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
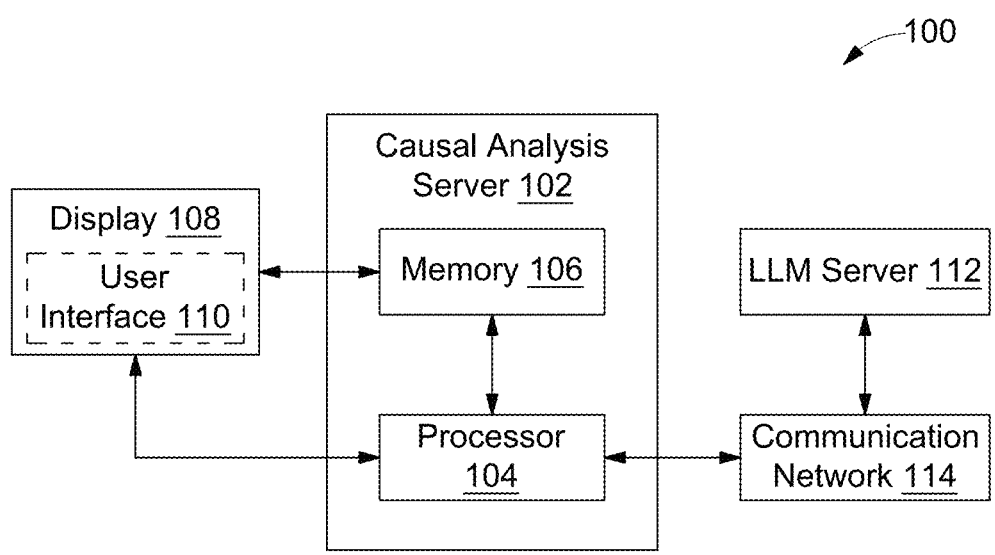
FIG. 1 is a block diagram of an exemplary system for identifying domain-specific service management hotspots, in accordance with some embodiments.

Referring now to FIG. 1, an exemplary system 100 for identifying domain-specific service management hotspots is illustrated, in accordance with some embodiments. The domain-specific service management hotspots may refer to areas of the IT infrastructure or applications that may be prone to recurrent issues or are at a higher risk of failure. The system 100 may include a causal analysis server 102 (for example, a server, a desktop, a laptop, a notebook, a netbook, a tablet, a smartphone, a mobile phone, or any other computing device), in accordance with some embodiments of the present disclosure. The causal analysis server 102 may identify domain-specific service management hotspots.

As will be described in greater detail in conjunction with FIGS. 2-19, the causal analysis server 102 may receive raw data (for example, ticket dump data, Configuration Management Database (CMDB) data, logs and events data) corresponding to a plurality of domain-specific issues. The raw data may include at least one of image data and text data. The causal analysis server 102 may generate a plurality of chunks from the raw data using an optimal chunking and tokenizing algorithm selected from a set of chunking and tokenizing algorithms to obtain chunked data. The chunked data may include smaller text segments obtained from the text data. Further, the causal analysis server 102 may create a plurality of embeddings (i.e., vector representations) from the chunked data through an embedding model. The causal analysis server 102 may further cluster the plurality of embeddings into a set of clusters and a set of sub-clusters associated with each of the set of clusters, based on a similarity analysis. The causal analysis server 102 may further determine a set of cluster labels corresponding to the set of clusters and a set of sub-cluster labels corresponding to the set of sub-clusters associated with each of the set of clusters, via a Large Language Model (LLM). The set of cluster labels and the set of sub-cluster labels are in natural language. The causal analysis server 102 may further identify a plurality of hotspots corresponding to the plurality of domain-specific issues based on the set of cluster labels and the set of sub-cluster labels.

In some embodiments, the causal analysis server 102 may include one or more processors 104 and a memory 106. The memory 106 may store instructions that, when executed by the one or more processors 104, cause the one or more processors 104 to identify domain-specific service management hotspots, in accordance with aspects of the present disclosure. The memory 106 may also store various data (for example, raw image and text data, chunked data, embeddings, personally identifiable information (PII), LLM data, a set of parameters associated with tokens, and the like) that may be captured, processed, and/or required by the system 100. The memory 106 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

The system 100 may further include a user device 108. The system 100 may interact with a user via a user interface 110 accessible via a display of the user device 108. In some embodiments, the system 100 may also include an LLM server 112. In some embodiments, the causal analysis server 102 may interact with the LLM server 112 over a communication network 114 for sending or receiving various data. The LLM server 112 may be a remote server, a digital device, or another computing system. The causal analysis server 102 may access an LLM through the LLM server 112. In an embodiment, the LLM may be internal to the causal analysis server 102. In other words, the LLM may be stored in the memory 106. In such an embodiment, the LLM server 112 may be excluded from the system 100.

Figure 2:
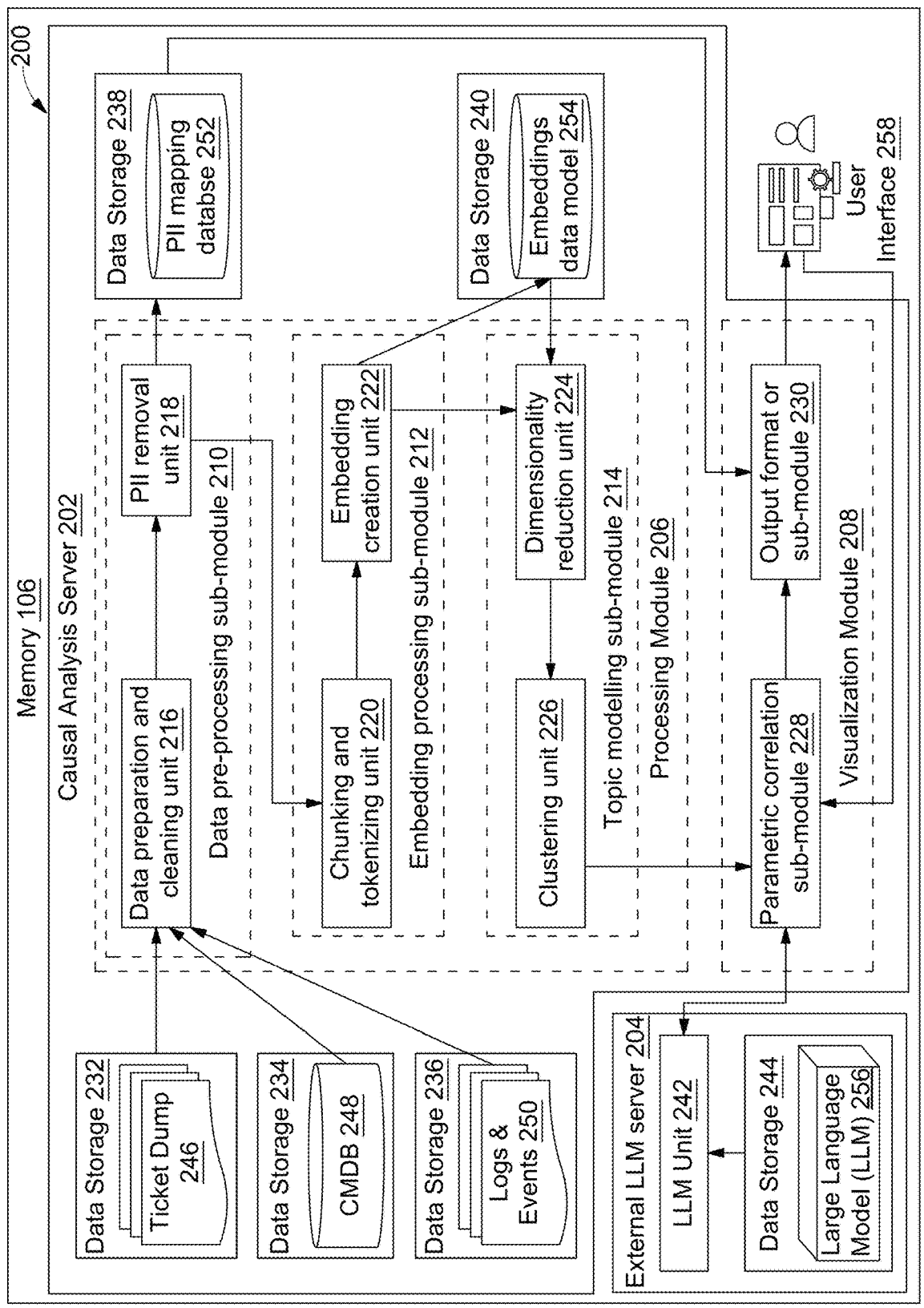
FIG. 2 illustrates a functional block diagram of a system for identifying domain-specific service management hotspots, in accordance with some embodiments.

Referring now to FIG. 2, a functional block diagram of a system 200 for identifying domain-specific service management hotspots is illustrated, in accordance with some embodiments. FIG. 2 is explained in conjunction with FIG. 1. The system 200 may include a causal analysis server 202 (analogous to the causal analysis server 102), and an external LLM server 204 (analogous to the LLM server 112). The causal analysis server 202 may include, within a memory (such as the memory 106), a processing module 206 and a visualization module 208. The processing module 206 may include a data pre-processing sub-module 210, an embedding processing sub-module 212, and a topic modelling sub-module 214. The data pre-processing sub-module 210 may include a data preparation and cleaning unit 216 and a Personality Identification Information (PII) removal unit 218. The embedding processing sub-module 212 may include a chunking and tokenizing unit 220 and an embedding creation unit 222. The topic modelling sub-module 214 may include a dimensionality reduction unit 224 and a clustering unit 226. The visualization module 208 may include a parametric correlation sub-module 228 and an output formator sub-module 230. The causal analysis server 202 may further include a first data storage 232, a second data storage 234, a third data storage 236, a fourth data storage 238, and a fifth data storage 240. The external LLM server 204 may include a LLM unit 242, and a sixth data storage 244. In an embodiment, the LLM unit 242 and the sixth data storage 244 may be a part of the smart causal analysis server 202. In such an embodiment, the external LLM server 204 may be excluded from the system 200.

The data preparation and cleaning unit 216 may receive raw data corresponding to a plurality of domain-specific issues. The raw data may include at least one of image data and text data. The raw data may include at least one of ticket dump data 246, configuration management data base (CMDB) data 248, and logs and events data 250. It should be noted that the ticket dump data 246 may be stored in the first data storage 232, the CMDB data 248 may be stored in the second data storage 234, and the logs and events data 250 may be stored in the third data storage 236. The ticket dump data 246 may include a historical events of IT tickets. The logs and events data 250 may include the data from the IT infrastructure components. The logs and events data 250 may help to increase accuracy of identification of a plurality of hotspots. A hotspot (or a domain-specific service management hotspot) may be a primary potential issue within the IT infrastructure of an enterprise associated with a particular domain. The hotspot may refer to areas of the IT infrastructure or applications that may be prone to recurrent issues or are at a higher risk of failure.

After the raw data is received, the data preparation and cleaning unit 216 may pre-process the raw data using one or more pre-processing techniques. When the raw data includes the image data, the data preparation and cleaning unit 216 may obtain extracted text data from the image data through a text extraction technique (or Natural Language Processing). The text extraction techniques may include, but may not be limited to Named Entity Recognition, Sentiment Analysis, Text Summarization, Aspect Mining, or the like. Further, the data preparation and cleaning unit 216 may perform data cleaning on the text data of the raw data and the extracted text data from the image data to obtain a pre-processed data. In simpler words, the data preparation and cleaning unit 216 may prepare and clean the ticket dump data 246, the CMDB data 248, and the logs and events data 250 by the Natural Language Processing to obtain the pre-processed data.

Further, the data preparation and cleaning unit 216 may send the pre-processed data to the PII removal unit 218. The pre-processed data may include Personal Identifiable Information (PII) data. The PII removal unit 218 may detect the PII data in the pre-processed data. The PII removal unit 218 may then remove the PII data from the pre-processed data. In other words, the PII removal unit 218 may detect inaccurate or sensitive personal information (i.e., the PII data) from the ticket dump data 246, the CMDB data 248, and the logs and events data 250.

Upon removal of the PII data, the PII removal unit 218 may replace (or map) the PII data with placeholder data to obtain PII-free data. Further, the PII removal unit 218 may send the PII-free data to the chunking and tokenizing unit 220 of the embedding processing sub-module 212. Additionally, the PII removal unit 218 may send the mapping between the PII data and the placeholder data to the fourth data storage 238. The fourth data storage 238 may include a PII mapping database 252.

Further, the chunking and tokenizing unit 220 may generate a plurality of chunks from the raw data (or the PII-free data) using an optimal chunking and tokenizing algorithm selected from a set of chunking and tokenizing algorithms to obtain chunked data. The chunking and tokenizing unit 220 may input the preprocessed data to each of the set of chunking and tokenizing algorithms. For each chunking and tokenizing algorithm of the set of chunking and tokenizing algorithm, the chunking and tokenizing unit 220 may generate a preliminary plurality of chunks from the raw data through the chunking and tokenizing algorithm. Each of the set of chunking and tokenizing algorithms may be configured with a unique set of parameters. Through the chunking and tokenizing algorithm, the chunking and tokenizing unit 220 may generate a preliminary plurality of tokens from the preliminary plurality of chunks. The chunking and tokenizing unit 220 may evaluate the preliminary plurality of tokens based on a cosine similarity score variance. Further, the chunking and tokenizing unit 220 may select the optimal chunking and tokenizing algorithm from the set of chunking and tokenizing algorithms based on the evaluation.

The plurality of chunks, thus generated to obtain the chunked data, may be the preliminary plurality of chunks generated by the optimal chunking and tokenizing algorithm. Finally, the chunking and tokenizing unit 220 may generate a plurality of tokens from the plurality of chunks through the optimal chunking and tokenizing algorithm. The plurality of tokens, thus generated, may be the preliminary plurality of tokens generated by the optimal chunking and tokenizing algorithm. In other words, the chunking and tokenizing unit 220 may break down the PII-free data into smaller (and more manageable) units (i.e., the plurality of chunks and the plurality of tokens) to obtain chunked and tokenized data. The chunking and tokenizing unit 220 may send the chunked and tokenized data to the embedding creation unit 222 of the embedding processing sub-module 212.

The embedding creation unit 222 may create a plurality of embeddings from the chunked and tokenized data through an embedding model. It may be noted that the plurality of embeddings may represent the chunked and tokenized data in a continuous and dense vector space and, additionally, may capture semantic and contextual information of the tokenized and chunked data. The embedding creation unit 222 may further send the plurality of embeddings corresponding to the chunked and tokenized data to the dimensionality reduction unit 224. The embedding creation unit 222 may also send the plurality of embeddings to the fifth data storage 240. The fifth data storage 240 may include an embeddings data model 254. The embeddings data model 254 may be a vector database where the plurality of embeddings may be stored.

The dimensionality reduction unit 224 of the topic modelling sub-module 214 may receive the plurality of embeddings from the embedding creation unit 222. Alternatively, the dimensionality reduction unit 224 may retrieve the stored plurality of embeddings from the embeddings data model 254 corresponding to the chunked and tokenized data. Further, the dimensionality reduction unit 224 may reduce the dimensions of the plurality of embeddings through a dimensionality reduction algorithm preconfigured with a set of customized hyperparameters. Further, the dimensionality reduction unit 224 may send the dimensionality reduced plurality of embeddings to the clustering unit 226.

The clustering unit 226 may cluster the plurality of embeddings into a set of clusters and a set of sub-clusters associated with each of the set of clusters, based on a similarity analysis. Thus, different issues from the raw data may be grouped into the set of clusters and the associated sets of sub-clusters. The clustering unit 226 may calculate a similarity score corresponding to the plurality of embeddings. Based on the similarity score, the clustering unit 226 may group one or more of the plurality of embeddings into one of a cluster of the set of clusters or a sub-cluster of the set of sub-clusters associated with each of the set of clusters. In other words, the clustering unit 226 may create clusters of similar topics and subtopics in a textual format. The topics and subtopics may correspond to issues identified from the pre-processed data. The clusters of similar topics and the clusters of similar subtopics may be arranged hierarchically.

Additionally, the clustering unit 226 may identify one or more affected servers corresponding to each of the set of sub-clusters using the CMDB data 248. The clustering unit 226 may then determine a count corresponding to each of the set of sub-clusters using the ticket dump data 246. Further, the clustering unit 226 may send the clustered hierarchical topics (i.e., the set of clusters) and subtopics (i.e., the associated sets of sub-clusters) along with details like count (i.e., number of occurrences of an issue) and affected CMDB servers (i.e., servers that are affected from the issues) in form of a cluster table to the parametric correlation sub-module 228 of the visualization module 208. The cluster table may include the set of clusters (corresponding to topics) and the associated sets of sub-clusters (corresponding to sub-topics). Thus, the clustering unit 228 may send the cluster table to the parametric correlation sub-module 228 of the visualization module 208.

The parametric correlation sub-module 228 may determine a set of cluster labels (i.e., topic labels) corresponding to the set of clusters and a set of sub-cluster labels (i.e., sub-topic labels) corresponding to the set of sub-clusters associated with each of the set of clusters, via the LLM 256. It should be noted that the set of cluster labels and the set of sub-cluster labels may be generated in natural language. The parametric correlation sub-module 228 may create a prompt based on the set of clusters and the set of sub-clusters associated with each of the set of clusters. The parametric correlation sub-module 228 may then input the prompt to the LLM unit 242 of the external LLM server 204.

The LLM unit 242 may generate, using the LLM 256, the set of cluster labels corresponding to the set of clusters and the set of sub-cluster labels corresponding to the set of sub-clusters based on the prompt. It should be noted that the LLM 256 may be a fine-tuned LLM specific to a domain of the plurality of domain-specific issues. In simpler words, the LLM unit 242 may convert the topics and sub-topics into hierarchical labels through the LLM 256 stored in the data storage 244. Further, the parametric sub-module 228 may receive the set of cluster labels and the set of sub-cluster labels from the LLM unit 242. The set of cluster labels and the set of sub-cluster labels may be received in form of a labelled table. The labelled table may include the set of cluster labels, the set of sub-cluster labels corresponding to the sub-topics, the one or more affected servers, and the count. Further, the parametric correlation sub-module 228 may send the labelled table to the output formator sub-module 230.

The output formator sub-module 230 may generate a visualization map (i.e., hotspot insight) based on the labelled table (i.e., the set of cluster labels and the set of sub-cluster labels, the one or more affected servers, and the count). The output formator sub-module 230 may convert the labels along with the server details into the visualization map. By way of an example, the visualization map may be presented as a mind map, a brain map, a concept map, or the like. Further, the output formator sub-module 230 may send the visualization map to the user interface 258. The output formator sub-module 230 may further retrieve and use the mapping between the PII fields and the placeholders for the PII fields from the fourth data storage 238 to create the visualization. Further, the output formator sub-module 230 may identify a plurality of hotspots corresponding to the plurality of domain-specific issues based on the set of cluster labels and the set of sub-cluster labels. The output formator sub-module 230 may send the visualization map to the user interface 258. In other words, the output formator sub-module 230 may render, using the user interface 258, the visualization map based on the set of cluster labels and the set of sub-cluster labels, the one or more affected servers, and the count.

The parametric correlation sub-module 228 may receive the user feedback through the user interface 258, corresponding to one or more of the set of cluster labels or one or more of the set of sub-cluster labels corresponding to each of the set of cluster labels on the visualization map. Based on the user feedback, the parametric correlation sub-module 228 may create a prompt. Further, the parametric correlation sub-module 228 may send the prompt to the LLM unit 242. The LLM unit 242 may input the prompt to the LLM 256. Further, for each label of the one or more of the set of cluster labels or one or more of the set of sub-cluster labels corresponding to each of the set of cluster labels, the LLM unit 242 may generate an updated label based on the prompt using the LLM 256. Thus, the user feedback may be used for enhancing the quality of labels generated by the LLM 256.

It should be noted that all such aforementioned modules 202-256 may be represented as a single module or a combination of different modules. Further, as will be appreciated by those skilled in the art, each of the modules 202-256 may reside, in whole or in parts, on one device or multiple devices in communication with each other. In some embodiments, each of the modules 202-256 may be implemented as dedicated hardware circuit comprising custom application-specific integrated circuit (ASIC) or gate arrays, off-the-shelf semiconductors such as logic chips, transistors, or other discrete components. Each of the modules 202-256 may also be implemented in a programmable hardware device such as a field programmable gate array (FPGA), programmable array logic, programmable logic device, and so forth. Alternatively, each of the modules 202-256 may be implemented in software for execution by various types of processors (e.g., processor 104). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for identifying domain-specific service management hotspots. For example, the exemplary system 100 and the associated causal analysis server 102 may identify domain-specific service management hotspots by the processes discussed herein. In particular, as will be appreciated by those of ordinary skill in the art, control logic and/or automated routines for performing the techniques and steps described herein may be implemented by the system 100 and the associated causal analysis server 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
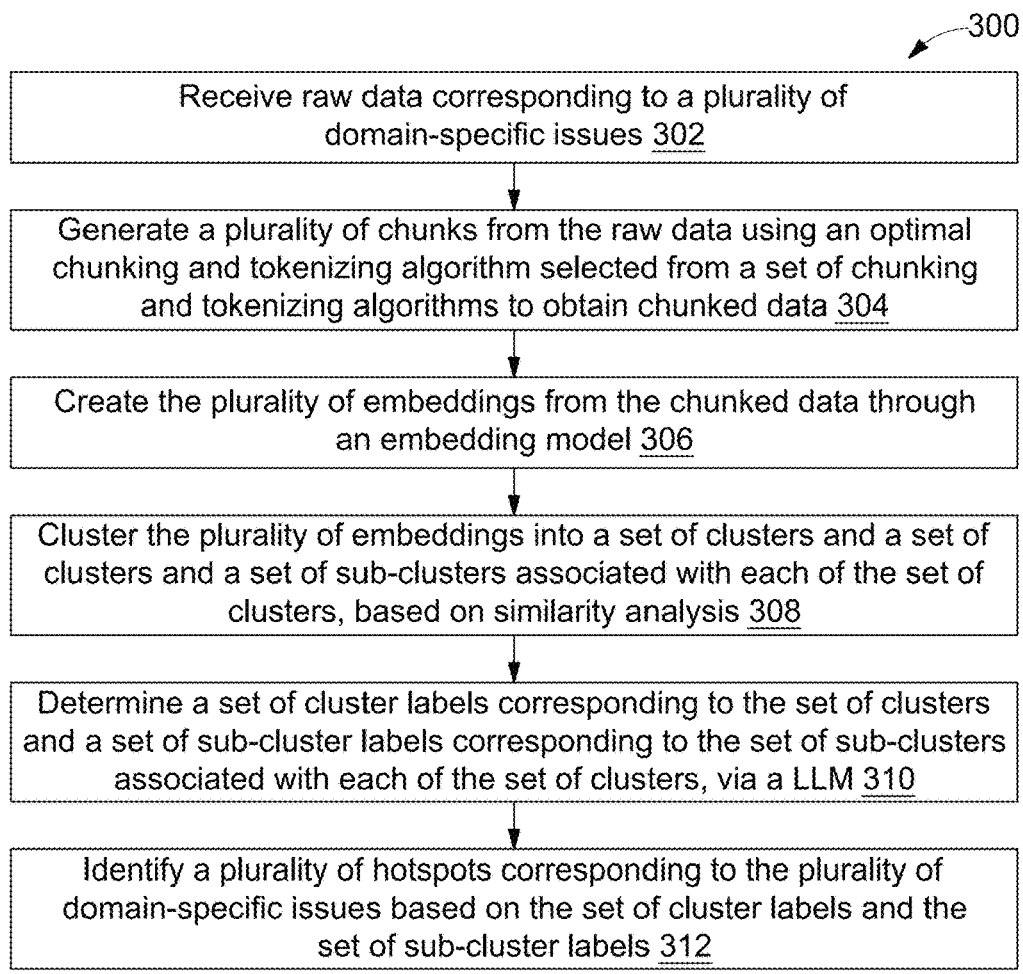
FIG. 3 illustrates a flow diagram of an exemplary process for identifying domain-specific service management hotspots in some embodiments.

Referring now to FIG. 3, an exemplary process 300 for identifying domain-specific service management hotspots is depicted via a flowchart, in accordance with some embodiments. The process 300 may be implemented by the causal analysis server 102 of the system 100. The process 300 may include receiving, by the data preparation and clustering unit, raw data corresponding to a plurality of domain-specific issues, at step 302. The raw data may include at least one of ticket dump data (such as the ticket dump 246), CMDB data (such as the CMDB 248, and logs and events data (such as the logs and events 250). Further, the process 300 may include generating, by a chunking and tokenizing unit (such as the chunking and tokenizing unit 220), a plurality of chunks from the raw data using an optimal chunking and tokenizing algorithm selected from a set of chunking and tokenizing algorithm selected from a set of chunking and tokenizing algorithms, at step 304. Further, the process 300 may include creating, by an embedding creation unit (such as the embedding creation unit 222), a plurality of embeddings from the chunked data through an embedding model, at step 306.

Further, the process 300 may include clustering, by a clustering unit (such as the clustering unit 226), the plurality of embeddings into a set of clusters and a set of sub-clusters associated with each of the set of clusters, based on a similarity analysis, at step 308. It should be noted that the similarity analysis may include calculating, by the clustering unit, a similarity score corresponding to the plurality of embeddings. Further, the similarity analysis may include, based on the similarity score, grouping, by the clustering unit, one or more plurality of embeddings into one of a cluster of the set of clusters or a sub-cluster of the set of sub-clusters associated with each of the set of clusters. Additionally, the process 300 may include identifying, by the clustering unit, one or more affected servers corresponding to each of the set of sub-clusters using the CMDB data. Further, the process 300 may include determining a count corresponding to each of the set of sub-clusters using the ticket dump data.

Further, the process 300 may include determining, by a parametric correlation sub-module (such as the parametric correlation sub-module 228), a set of cluster labels corresponding to the set of clusters and a set of sub-cluster labels corresponding to the set of sub-clusters associated with each of the set of clusters, via an LLM (such as the LLM 256), at step 310. It should be noted that cluster labels and the set of sub-cluster labels may be in natural language. Further, the process 300 may include identifying, by an output formator sub-module (such as the output formator sub-module 230), a plurality of hotspots corresponding to the plurality of domain-specific issues based on the set of cluster labels and the set of sub-cluster labels, at step 312.

Figure 4:
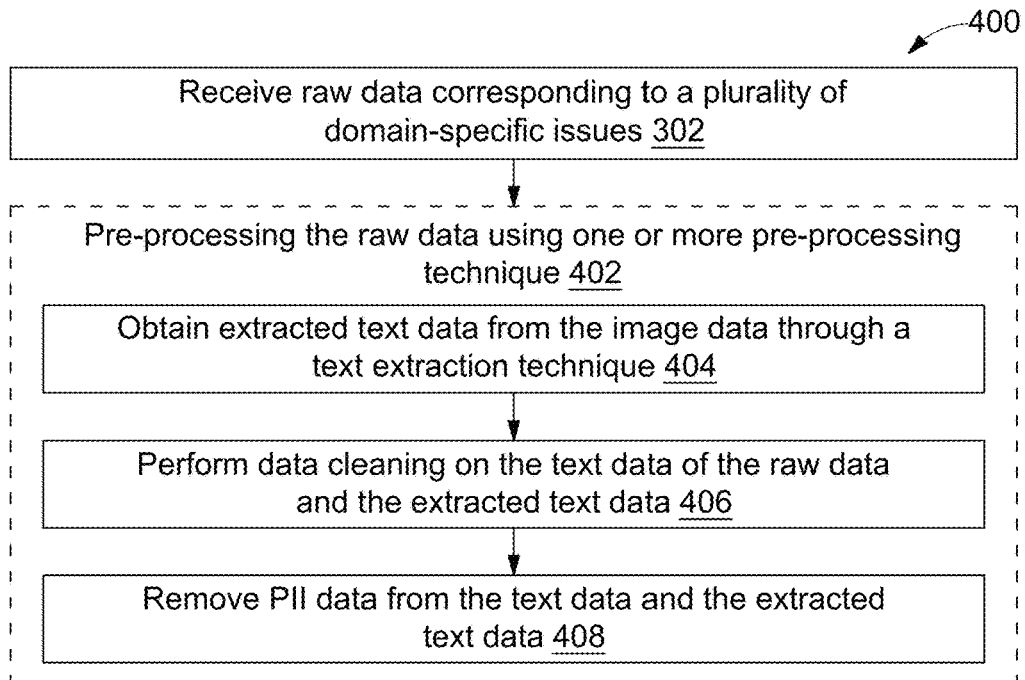
FIG. 4 illustrates a flow diagram of an exemplary process for removing PII data from the text data and the extracted text data in some embodiments.

Referring now to FIG. 4, an exemplary process 400 for removing PII data from the text data and the extracted text data is depicted via a flowchart, in accordance with some embodiments. The process 400 may be implemented by the causal analysis server 102 of the system 100. The process 400 may include receiving, by the data preparation and cleaning unit (such as the data preparation and cleaning unit 218), the raw data corresponding to the plurality of domain-specific issues, at step 302. The raw data may include at least one of image data and text data. Upon receiving the raw data, the process 400 may include pre-processing, by the data preparation and cleaning unit, the raw data using one or more pre-processing technique, at step 402. The step 402 of the process 400 may include obtaining, by the data preparation and cleaning unit, extracted text data from the image data through the text extraction technique, when the raw data includes the image data, at step 404. Further, Further, the step 402 of the process 400 may include removing, by a PII removal unit (such as the PII removal unit 218) PII data from the text data and the extracted data, at step 408.

Referring now to FIG. 5, a table 500 representing parameters corresponding to ticket dump data (for example, the ticket dump data 246) is illustrated, in accordance with some embodiments. The parameters of the ticket dump data 246 may include historical ticket data, contextual ticket data, and other ticket data (for example, reassignment count, reopen count, assignment group, configuration item, and the like). The historical ticket data may include title of the ticket, description (for example, administrator notes, closure notes, images notes, and the like), created datetime, closed datetime, priority, and impact. The title may include the short title of the issue. The description may include the details of the issue, work notes entered by the Subject Matter Experts (SMEs). The work notes may include observations, evaluations, discussion summaries, test results, etc. The description may further include closure remarks with short description of the resolution provided. The description may also include images. The created datetime may be the date and time of the ticket creation. The closed datetime may be the date and time of the ticket closure. The priority may be the issue resolution urgency based on business criticality. The impact may be the impact of the issues, based on the impacted users, groups, or departments. The historical ticket data may be used for processing and analysis.

The contextual ticket data may include the location. The contextual data may help to segment and group the analysis result. The location may be the location of the impacted user. The type may indicate the top-level classification indicated by ticket initiator. For example, network, storage, data center, Virtual Desktop Infrastructure (VDI) etc. The other ticket data may be the additional input. The reassignment count may indicate number of hops from one resolution group to another group among IT departments. The reopen count may indicate number of times ticket is reopened due to re-occurrence or in-adequate resolution. The assignment group may indicate the group assigned for providing resolution. The configuration item may include the details of the IT infrastructure component where issue may be observed. The other ticket data may help to improve the accuracy of the results.

Referring now to FIG. 6, a table 600 representing exemplary ticket dump data (for example, the ticket dump data 246) is illustrated, in accordance with an embodiment. The table 600 may include serial number, the title, description, created datetime, closed datetime, priority, and impact. As represented in the table 600, the title for serial number 0 is "struggling with sluggish file retrieval from the central storage hub due to congested network traffic." The description is "the system's CPU usage is consistently high, and the disk activity is excessive." The created datetime is "05/12/2023" and "10:34:40 AM" respectively. The closed datetime is "05/12/2023" and "10:34:40 AM" respectively. The priority is "3". The impact is "individual."

Further, the title for serial number 1 is "Observed that numerous crucial documents have vanished from a communal folder." The description is "The communal folder is "D: Data". This shared drive is accessible for all the users within our department." The created datetime is "20/11/2023" and "10:34:40 AM" respectively. The closed datetime is "23/11/2023" and "10:34:40 AM" respectively. The priority is "1". The impact is "organization."

Further, the title for serial number 2 is "Alert received: SAN storage running out of space, urgent action required to prevent data loss." The description is "Step 1: Verify Alert and Severity Level-Check the severity level of the alert (e.g., critical, warning) and verify if it's a false positive or genuine issue . . . " The created datetime is "13/12/2023" and "10:34:40 AM" respectively. The closed datetime is "16/12/2023" and "10:34:40 AM" respectively. The priority is "2". The impact is "wing."

Further, the title for serial number 3 is "Generate according to: Experiencing slow data transfer rates when accessing files on the network share." The description is "Error message received: "Access Denied" when attempting to access shared folders. Unable to open the PDF file. Error message received: "File Format Not Supported" when attempting to open the document . . . "The created datetime is "29/11/2023" and "10:34:40 AM", respectively. The closed datetime is "Jan. 12, 2023" and "10:34:40 AM", respectively. The priority is "3". The impact is "wing".

Referring now to FIG. 7, a table 700 representing parameters corresponding to CMDB data (for example, the CMDB data 248) is illustrated, in accordance with some embodiments. The CMDB data 248 may include information about hardware and software assets. The CMDB data 248 may include data like server name, hostname, Service Level Agreement (SLA), environment, platform version, and segment. As represented in the table 700, the server name may include the name of the server for identification. The hostname may be a label to a device connected to a computer network. The hostname may help to identify the device in various forms of electronic communication. The SLA may be a contact between service provider and customer. The environment may be the type of deployment or usage of the server like production or test usage and deployment. The platform version may be the Operating System (OS) and versions on which server is running. The segment may be the area or region where the server may be located. The CMDB data 248 may be used for mapping the configuration items (both software and hardware) with the relevant issue groups (hotspots). The mapping may help the IT team to identify IT infrastructure components that may need attention.

Referring now to FIG. 8, a table 800 representing exemplary CMDB data is illustrated, in accordance with an embodiment. The table 800 may include the serial number, the server name, the hostname, the SLA, the environment, the platform version, and the segment. For serial number 0, the server name is "r0953", the hostname is "r0953.xxx.com", the SLA is "normal", the environment is "production", the platform version is "Ubuntu 22.02" and the segment is "Country 1". Similarly, for the serial number 1, the server name is "ger0289", the hostname is "ger0289.yyy.com", the SLA is "normal", the environment is "production", the platform version is "RHEL 8", and the segment is "Country 2". Similarly, for the serial number 2, the server name is "ger0970", the hostname is "ger0970.zzz.com", the SLA is "Basic", the environment is "Test", the platform version is "SLES 10", and the segment is "Country 3". Similarly, for the serial number 3, the server name is "cgf0660", the hostname is "cgf0660.aaa.com", the SLA is "normal", the environment is "production", the platform version is "Windows 7", and the segment is "Country 4".

Figure 9:
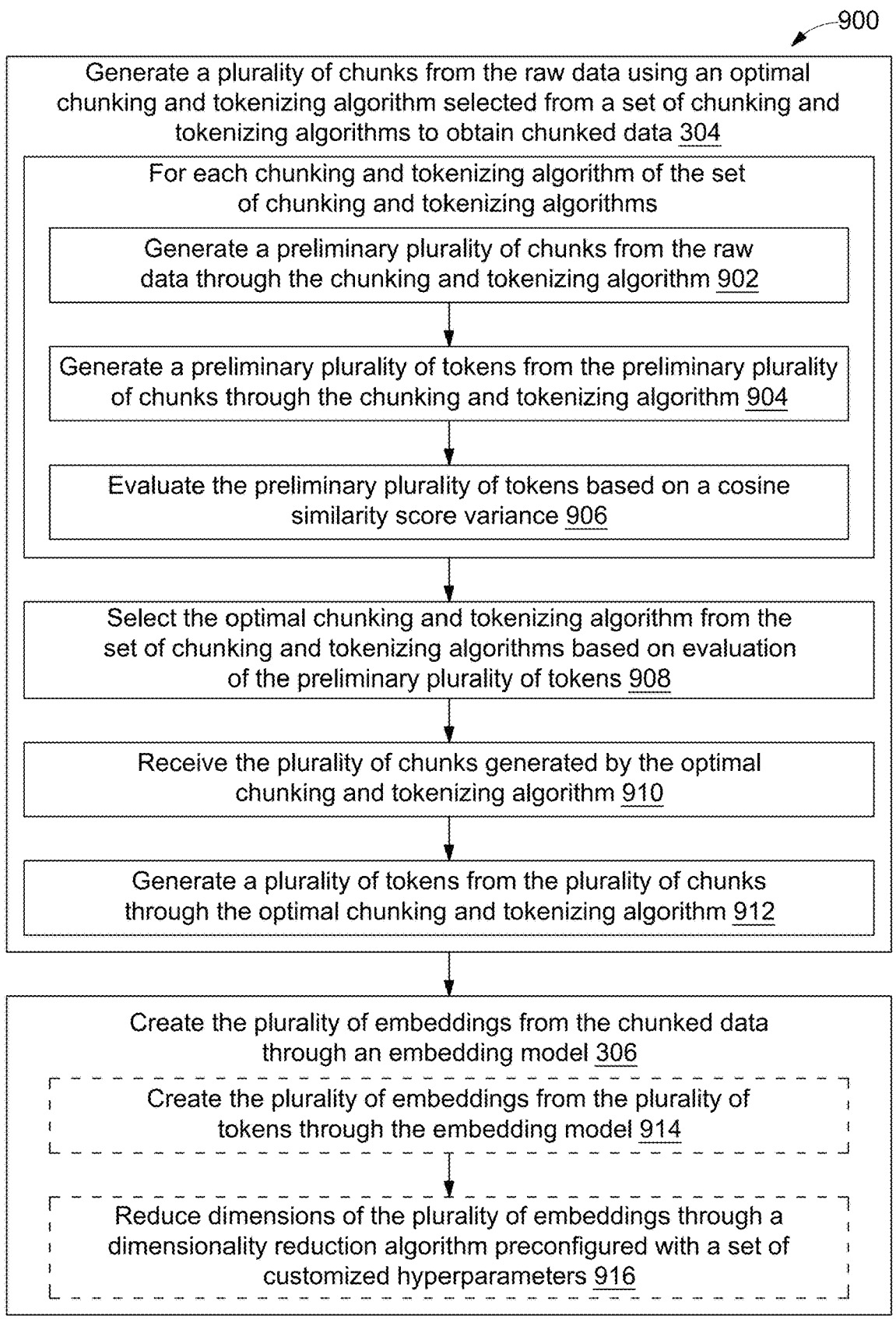
FIG. 9 illustrates a flow diagram of an exemplary process for generating a plurality of chunks from the raw data, in accordance with some embodiments.

Referring now to FIG. 9, a flow diagram of an exemplary process 900 for generating a plurality of chunks from the raw data is illustrated, in accordance with some embodiments of the present disclosure. The process 900 may be implemented by the causal analysis server 102 of the system 100. The process 900 may include generating the plurality of chunks from the raw data using the optimal chunking and tokenizing algorithm selected from the set of chunking and tokenizing algorithms to obtain chunked data, at step 304. For each chunking and tokenizing algorithm of the set of chunking and tokenizing algorithms, the step 304 of the process 900 may include generating, by the chunking and tokenizing unit (such as the chunking and tokenizing unit 220), a preliminary plurality of chunks from the raw data through the chunking and tokenizing algorithm, at step 902. It should be noted that each of the set of chunking and tokenizing algorithms may be configured with a unique set of parameters. Further, for each chunking and tokenizing algorithm of the set of chunking and tokenizing algorithms, the step 304 of the process 900 may include generating, by the chunking and tokenizing unit, a preliminary plurality of tokens from the preliminary plurality of chunks through the chunking and tokenizing algorithm, at step 904. Further, for each chunking and tokenizing algorithm of the set of chunking and tokenizing algorithms, the step 304 of the process 900 may include evaluating, by the chunking and tokenizing unit, the preliminary plurality of tokens based on a cosine similarity score variance, at step 906.

Further, the step 304 of the process 900 may include selecting, by the chunking and tokenizing unit, the optimal chunking and tokenizing algorithm from the set of chunking and tokenizing algorithms based on evaluation of the preliminary plurality of tokens, at step 908. It should be noted that the plurality of chunks is the preliminary plurality of chunks generated by the optimal chunking and tokenizing algorithm. Once the optimal chunking and tokenizing algorithm is selected, the step 304 of the process 900 may include receiving, by the chunking and tokenizing unit, the plurality of chunks generated by the optimal chunking and tokenizing algorithm, at step 910. Finally, the step 304 of the process 900 may include generating, by the chunking and tokenizing unit, a plurality of tokens from the plurality of chunks through the optimal chunking and tokenizing algorithm, at step 912.

Further, the process 900 may include creating, by the embedding creation unit, the plurality of embeddings from the chunked data through the embedding model, at step 306. The step 306 of the process 900 may include creating, by the embedding creation unit, the plurality of embeddings from the plurality of tokens through the embedding model, at step 914. Finally, the step 306 of the process 900 may include reducing, by a dimensionality reduction unit (such as the dimensionality reduction unit 224), dimensions of the plurality of embeddings through a dimensionality reduction algorithm preconfigured with a set of customized hyperparameters, at step 916.

Figure 10:
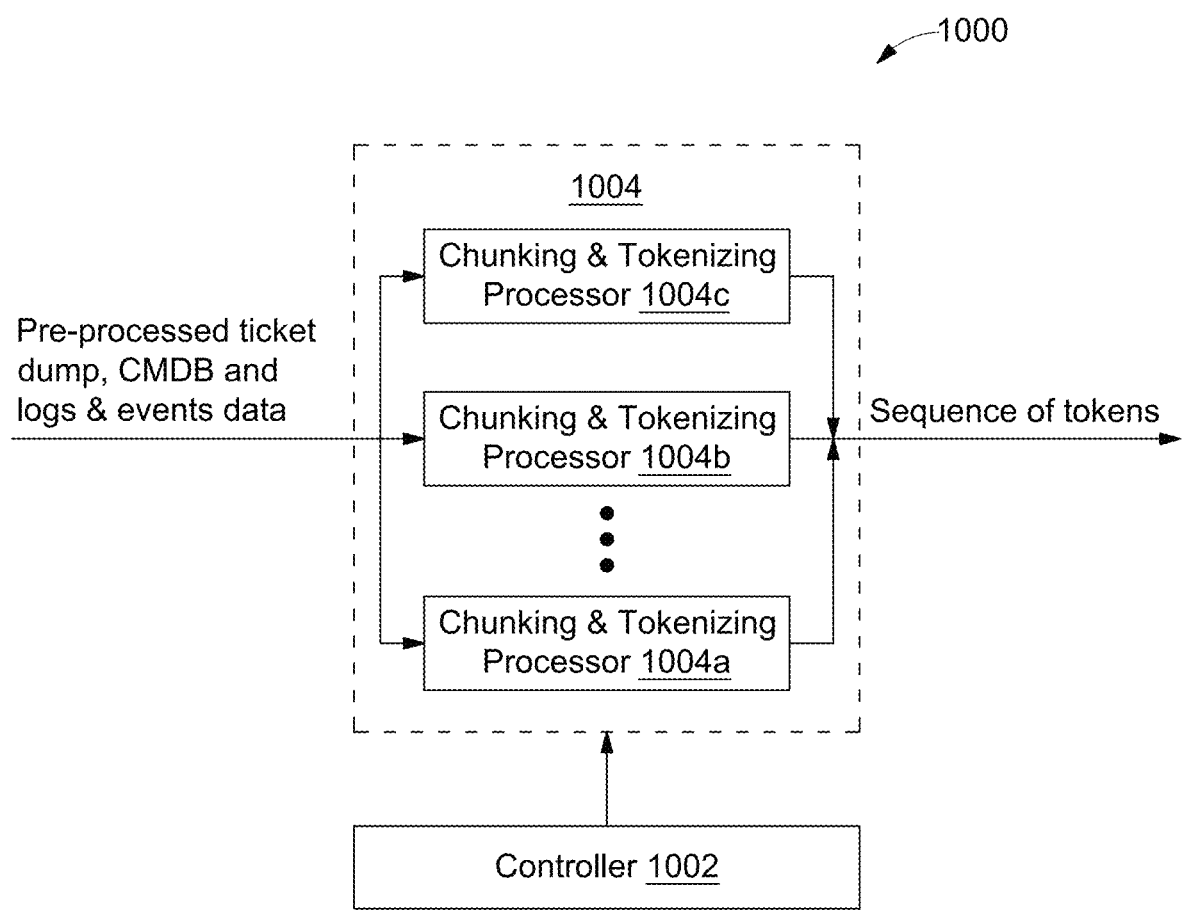
FIG. 10 illustrates a control logic for chunking and tokenizing the processed data, in accordance with some embodiments.

Referring now to FIG. 10, a control logic 1000 for chunking and tokenizing the processed data is illustrated, in accordance with some embodiments. The control logic 1000 may include a controller 1002, and chunking and tokenizing processor 1004. The tokenizing and chunking processors may include multiple processors, i.e., the chunking and tokenizing processors 1004a, the chunking and tokenizing processors 1004b, and the chunking and tokenizing processors 1004c (collectively referred to as a plurality of chunking and tokenizing processors 1004). Chunking is the process of dividing the text data into smaller units, such as sentences, phrases, or words, based on syntactic rules or punctuation marks. Chunking the pre-processed data may help reduce the complexity and size of the data. chunking may further extract meaningful information from the text. Tokenizing is the process of converting each chunk of text into token(s), which is a unique identifier that represents the chunk. Tokenizing may help standardize the data format and remove irrelevant or redundant information, such as stop words, punctuation, or case. The PII removal unit 218 may send the pre-processed data to the plurality of chunking and tokenizing processors 1004. Each of the plurality of chunking and tokenizing processors 1004 may run different chunking and tokenizing algorithms with different parameters. Results from the plurality of chunking and tokenizing processors 1004 may be evaluated. Upon evaluating the results, the best set of chunking and tokenizing algorithm and the parameters are selected to chunk and tokenize the pre-processed data.

The controller 1002 may evaluate the output of each algorithm running on the chunking and tokenizing processor along with the parameters. The controller 1002 may further select the best suitable algorithm and parameters. The controller 1002 may make the decisions based on the quality of the results. The controller 1002 may require multiple iterations to finalize the chunking and tokenizing algorithm and chunking parameters. The controller 1002 may further evaluate the quality of tokens of the different algorithms. The controller 1002 may evaluate the quality of the tokens by comparing cosine similarities of the tokens formed by different algorithms. The algorithm that may give high variance in the cosine similarities may be selected. In case multiple algorithms may give similar variance, the algorithm with median value may be selected. The selection of median value of the algorithm may help to reduce impact of clutter data on the final hotspot identification. Upon evaluating the quality of tokens, the controller 1002 may select the best algorithm for the next stage processing. By way of an example, each of the chunking and tokenizing processor 1004a, the chunking and tokenizing processor 1004b, and the chunking and tokenizing processor 1004c may generate tokens from the pre-processed data. The controller 1002 may determine that the output of the chunking and tokenizing processor 1004b is optimal based on pre-defined criteria. Thus, the output (i.e., the tokens) generated by the chunking and tokenizing processor 1004b may be selected for further processing.

The plurality of embeddings may be created corresponding to the pre-processed data. The creation of the plurality of embeddings is the process of mapping each token to a high dimensional vector of real numbers. The high dimensional vector of real numbers may include the semantic and syntactic features. The creation of the plurality of embeddings may help to represent the data in a continuous and dense space. The creation of the plurality of embeddings may further enable the mathematical operations and comparison between tokens. The plurality of embeddings may be created using various methods (for example, word2vec, GloVe, OpenAI Embeddings, or BERT). Upon creating the plurality of embeddings, the plurality of embeddings may be sent to the dimensionality reduction unit 224. Additionally, the plurality of embeddings is also sent to the fifth data storage 240 for storage in a vector database for future use.

Referring now to FIG. 11, a table 1100 representing the output of the clustering unit is illustrated, in accordance with an embodiment. The table 1100 may be a cluster table. In other words, the table 1100 may include details of main cluster (topics), sub clusters (sub-topics), count, and affected CMDB server. For example, the main cluster is "1_Power_Network_disruptions", the sub cluster is "Slow file retrieval from remote storage", the count is "366", and the affected CMDB server is "server_121". Similarly, the main cluster is "11_network_file_slow_response", the sub cluster is "Corruption and Delay", the count is "229", and the affected CMDB server is "server_356". Similarly, the main cluster is "11_network_file_slow_response", the sub cluster is "Corruption and Delay", the count is "229", and the affected CMDB server is "server_356". Similarly, the main cluster is "11_network_file_slow_response", the sub cluster is "Vanished critical files from network drive", the count is "193", and the affected CMDB server is "sever_451". Similarly, the main cluster is "11_network_file_slow_response", the sub cluster is "Remote connectivity issues with designated devices", the count is "180", and the affected CMDB server is "server_451". Similarly, the main cluster is "2_power_failure", the sub cluster is "Power supply instability in data center", the count is "164", and the affected CMDB server is "server_80". Similarly, the main cluster is "11_network_file_slow_response", the sub cluster is "Network Storage Retrieval Errors", the count is "161", and the affected CMDB server is "server_150". Similarly, the main cluster is "9_restrictions_security", the sub cluster is "Antivirus restrictions on modifying registry keys", the count is "140", and the affected CMDB server is "server_210". Similarly, the main cluster is "Remote storage sluggishness", the sub cluster is "slow storage response", the count is "161", and the affected CMDB server is "server_150". Similarly, the main cluster is "Remote storage sluggishness", the sub cluster is "low space", the count is "114", and the affected CMDB server is "server_451". The clustering unit 226 may send the data of the table to the Parametric correlation sub-module 228.

Figure 12:
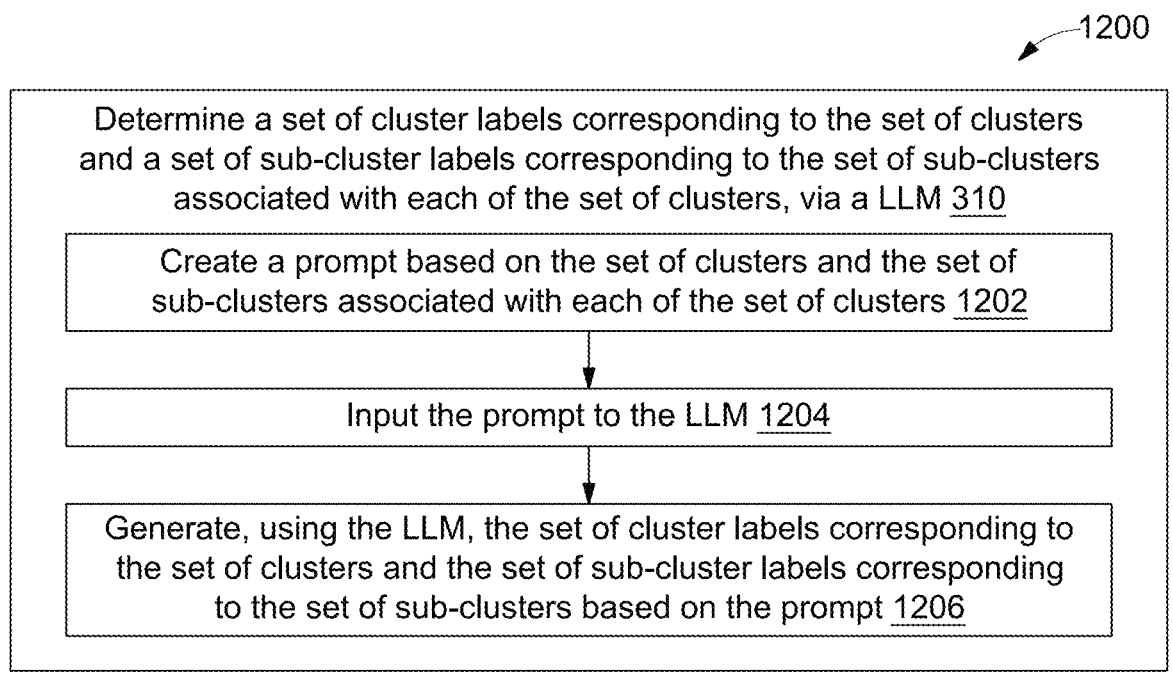
FIG. 12 illustrates a flow diagram of an exemplary process for determining a set of cluster labels and a set of sub-cluster labels, in accordance with some embodiments.

Referring now to FIG. 12, a flow diagram of an exemplary process 1200 for determining a set of cluster labels and a set of sub-cluster labels is illustrated, in accordance with some embodiments. The process 1200 may be implemented by the causal analysis server 102 of the system 100. The process 1200 may include determining, by a clustering unit (such as the clustering unit 226), the set of cluster labels corresponding to the set of clusters and the set of sub-cluster labels corresponding to the set of sub-clusters associated with each of the set of clusters, via an LLM (such as the LLM 256), at step 310.

The step 310 of the process 1200 may include creating, by a parametric correlation sub-module (such as the parametric correlation sub-module 228), a prompt based on the set of clusters and the set of sub-clusters associated with each of the set of clusters, at step 1202. Further, the step 310 of the process 1200 may include inputting, by the parametric correlation sub-module, the prompt to the LLM, at step 1204. It should be noted that the LLM is a fine-tuned LLM specific to a domain of the plurality of domain-specific issues. Further, the process 1200 may include generating, by an LLM unit (such as the LLM unit 242) and using the LLM, the set of cluster labels corresponding to the set of clusters and the set of sub-cluster labels corresponding to the set of sub-clusters based on the prompt, at step 1206.

Referring now to FIG. 13, a table 1300 corresponding to the topics and the labels corresponding to the sub-topics received from a LLM Unit (for example, the LLM unit 242) by the Parametric Correlation Sub-module (for example, the Parametric Correlation Sub-module 228) is illustrated, in accordance with an embodiment. The table 1300 may be a labelled table. The Parametric Correlation Sub-module 228 may additionally receive the details like Count (Occurrence of the issue) and the Affected CMDB Servers (Servers that are affected from the issues). The table 1300 may include the topic, sub-topic, count, affected CMDB servers. By the way of an example, the topic may be "Power disruptions", the sub-topic may be "Network Packet Corruption and Delay", the count may be "366", and the affected CMDB servers may be "server_121". Similarly, the topic may be "network latency", the sub-topic may be "Slow file retrieval from remote storage", the count may be "299", and the affected CMDB servers may be "server_356". The parametric correlation sub-module 228 may send the table to the output formator sub-module 230.

The user interface 258 may send the feedback to the parametric correlation sub-module 228. The parametric correlation sub-module 228 may prepare a new prompt by utilizing the previous prompt along with user's feedback. The sample prompt may be "Refinement_Prompt=
[
  }
    "role": "system",
    "content": "You are an experienced IT Infrastructure analyst."
  },
  {
    "role": "user",
    "content":"

The raw topics identified by clustering algorithm are as below
  {<topic> <sub-topic>, . . . }
Based on the above administrator friendly labels were created as below:
  {<topic_label> <sub-topic_label>, . . . }
Refine the label's structure based on the below user feedback:
  {<feedback> . . . }:}
"
}
]

Further, the parametric correlation sub-module 228 may provide the prompt to the LLM unit 242. The LLM unit 242 may generate refined tables utilizing LLM. The LLM may send the refined tables to the Parametric Correlation Sub-module 228. The Parametric Correlation Sub-module 228 may create a refined table (similar to the table 1300) based on labels corresponding to the topics and sub-topics, and the details like count (occurrence of the issue) and the affected CMDB servers (servers that are affected from the issues) to the Output Formator Sub-module 230.

Referring now to FIG. 14, a table 1400 representing data fetched from the fourth data storage (for example, the fourth data storage 238) is illustrated, in accordance with an embodiment. The table 1400 may include affected CMDB servers (i.e., mapped server names) and the real name of the servers from the ticket dump data. For example, the affected CMDB server may include "server_121", and the real name may include "s01c01". Similarly, server may include "server_356", and the real name may include "s01b09". Similarly, server may include "server_80", and the real name may include "s01b11". Similarly, server may include "server_451", and the real name may include "s01b01". Similarly, server may include "server_150", and the real name may include "s01a01" Similarly, server may include "server_210", and the real name may include "s01a15". By way of another example, the ticket dump data 246 may include an original name of a server, "HdcMkd00564.wipro.com". The CMDB data 248 may include details (such as office location, building, department, or the like) of the server "HdcMkd00564.wipro.com". The original name of the server "HdcMkd00564.wipro.com" may be mapped to a mapped server name "server_2351". The original name of the server "HdcMkd00564.wipro.com" may be replaced with the mapped name in the ticket dump data 246 by the PII removal unit 218 to obtain PII-free data. Further, the LLM unit 242 may process the PII-free data to identify hotspots. Further, the output formator sub-module 230 may display the original name of the affected server i.e., "HdcMkd00564.wipro.com" on the visualization map upon completion of the processing.

Figure 15:
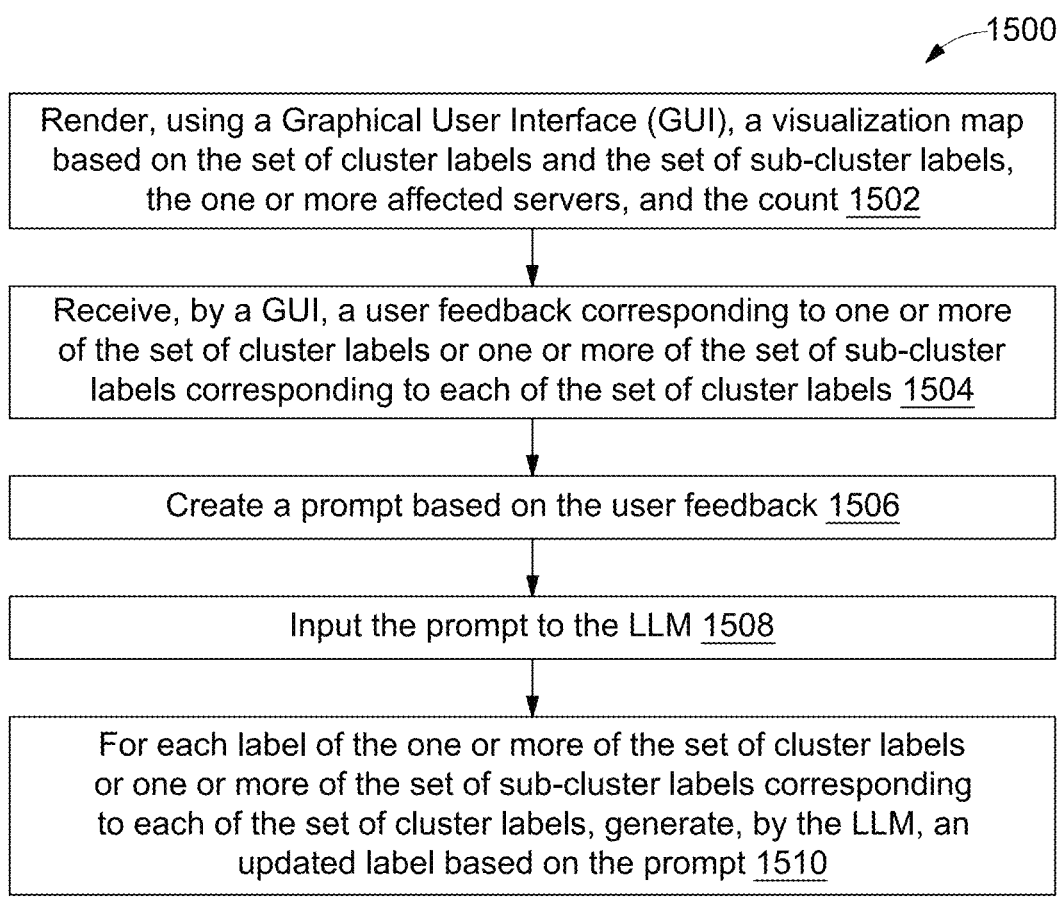
FIG. 15 illustrates a flow diagram of an exemplary process to generate an updated label based on the prompt, in accordance with some embodiments.

Referring now to FIG. 15, a flow diagram of an exemplary process 1500 to generate an updated label based on the prompt is illustrated, in accordance with some embodiments. The process 1500 may be implemented by the causal analysis server 102 of the system 100. Once the plurality of hotspots is identified, the process 1500 may include rendering, using a GUI (such as the user interface 258), a visualization map based on the set of cluster labels and the set of sub-cluster labels, the one or more affected servers, and the count, at step 1502. Further, the process 1500 may include receiving, by the GUI, a user feedback corresponding to one or more of the set of cluster labels or one or more of the set of sub-cluster labels corresponding to each of the set of cluster labels, at step 1504. Based on the user feedback, the process 1500 may include creating, by the GUI, a prompt, at step 1506. The prompt may include a predefined text and the user feedback. Further, the process 1500 may include inputting, by the GUI, the prompt to the LLM. Further, for each label of the one or more of the set of cluster labels or one or more of the set of sub-cluster labels corresponding to each of the set of cluster labels, the process 1500 may include generating, by the LLM, an updated label based on the prompt.

Figure 16:
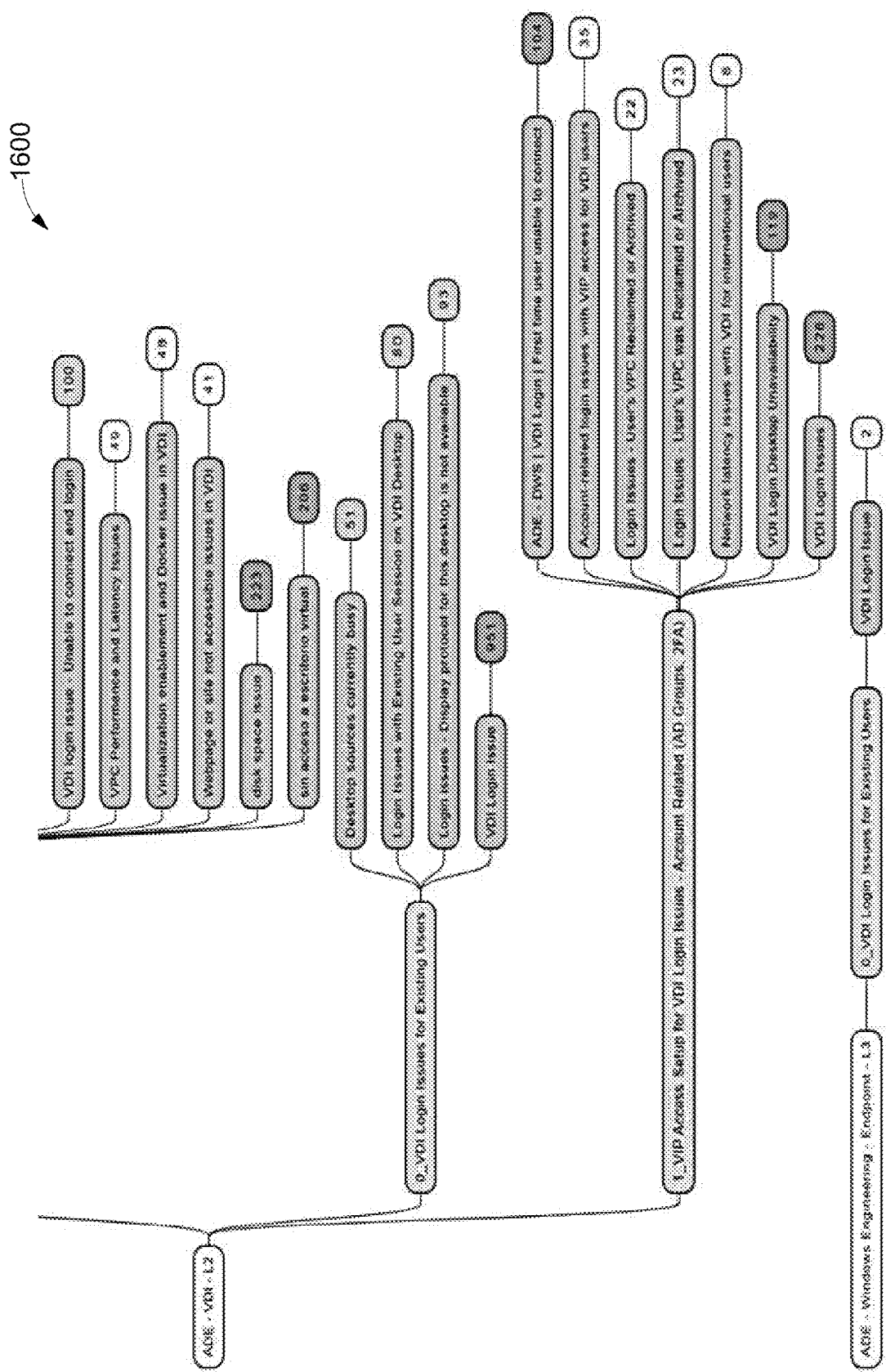
FIG. 16 illustrates a visualization map corresponding to hotspots, in accordance with an embodiment.

Referring now to FIG. 16, a visualization map 1600 corresponding to hotspots is illustrated, in accordance with an embodiment. The output formator sub-module 230 may send the visualization to the user interface 258. The output formator sub-module 230 may generate the visualization based on a table similar to the table 1300. The visualization map 1600 may include an affected CMDB server, one or more topics (i.e., set of cluster labels) associated with the affected CMDB server, one or more sub-topics (i.e., set of sub-cluster labels) corresponding to each of the one or more clusters, and a count number corresponding to the each of the one or more sub-clusters. The count may be color coded based on the number of issues. A high number of issues may indicate a critical issue and may be accordingly color coded (for example, by red color). By way of an example, the affected CMDB server may be "ADE-VDI-L2", the topic associated with the affected CMDB server is "0_VDI Login Issues for existing users", the sub-clusters corresponding to the clusters are "desktop sources currently busy", "login issues with existing session on VDI desktop", "Login issues-display protocol for this desktop is not available", and "VDI login issue". The count number corresponding to the desktop sources currently busy may be "51". The count number corresponding to the login issues with existing session on VDI desktop may be "35". The count number corresponding to the login issues login issues-display protocol for this desktop is not available may be "93". The count number corresponding to the login issues VDI login issue may be "951".

Figure 17:
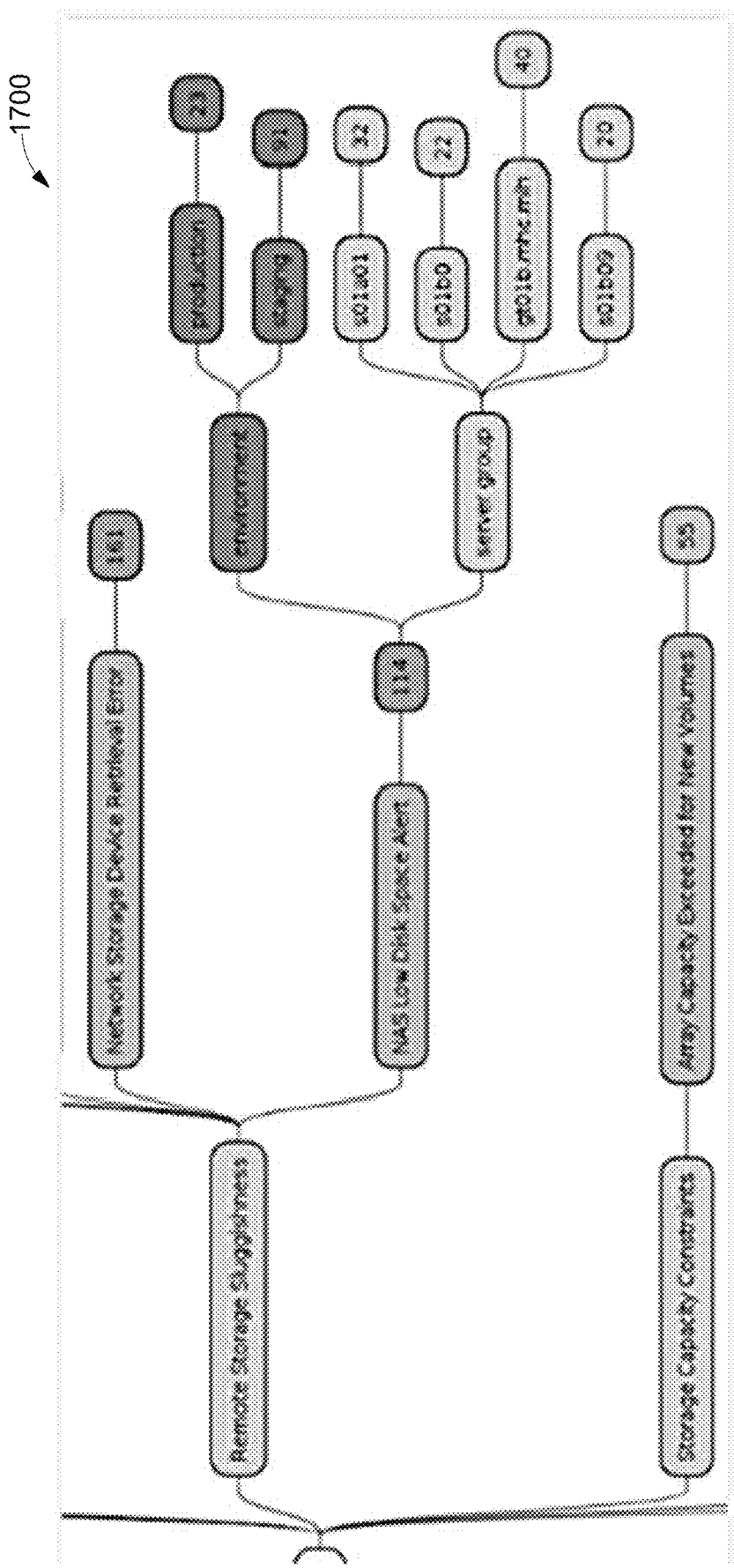
FIG. 17 illustrates a visualization map representing additional topics of the servers affected due to hotspot, in accordance with an embodiment.

Referring now to FIG. 17, a visualization map 1700 representing additional topics of the servers affected due to hotspot is illustrated, in accordance with an embodiment. The visualization map 1700 may include the environment and the server group corresponding to the one or more sub-clusters. By way of an example, for the topic "remote storage device retrieval error", the sub-cluster is "NAS low disk space alert". The count corresponding to the sub-topic is "114". The sub-cluster may include the environment. Alternatively, the sub-topic may include a server group. The environment may include "production" and "staging". The count of the production is "23" and the count of the staging is "91". The sum of the count of production and staging may be equal to the count of the sub-cluster, i.e., "114". Alternatively, the server group may include "s01a01", "s01b0", "gt01b.mhc.mlh", and "s01b09". The count corresponding to "s01a01" is "32", the count corresponding to "s01b0" is "22", the count corresponding to "gt01b.mhc.mlh" is "40", and the count corresponding to "s01b09" is "20". The sum of count of the server groups may be equal to the count of the sub-cluster i.e. "114".

Figure 18:
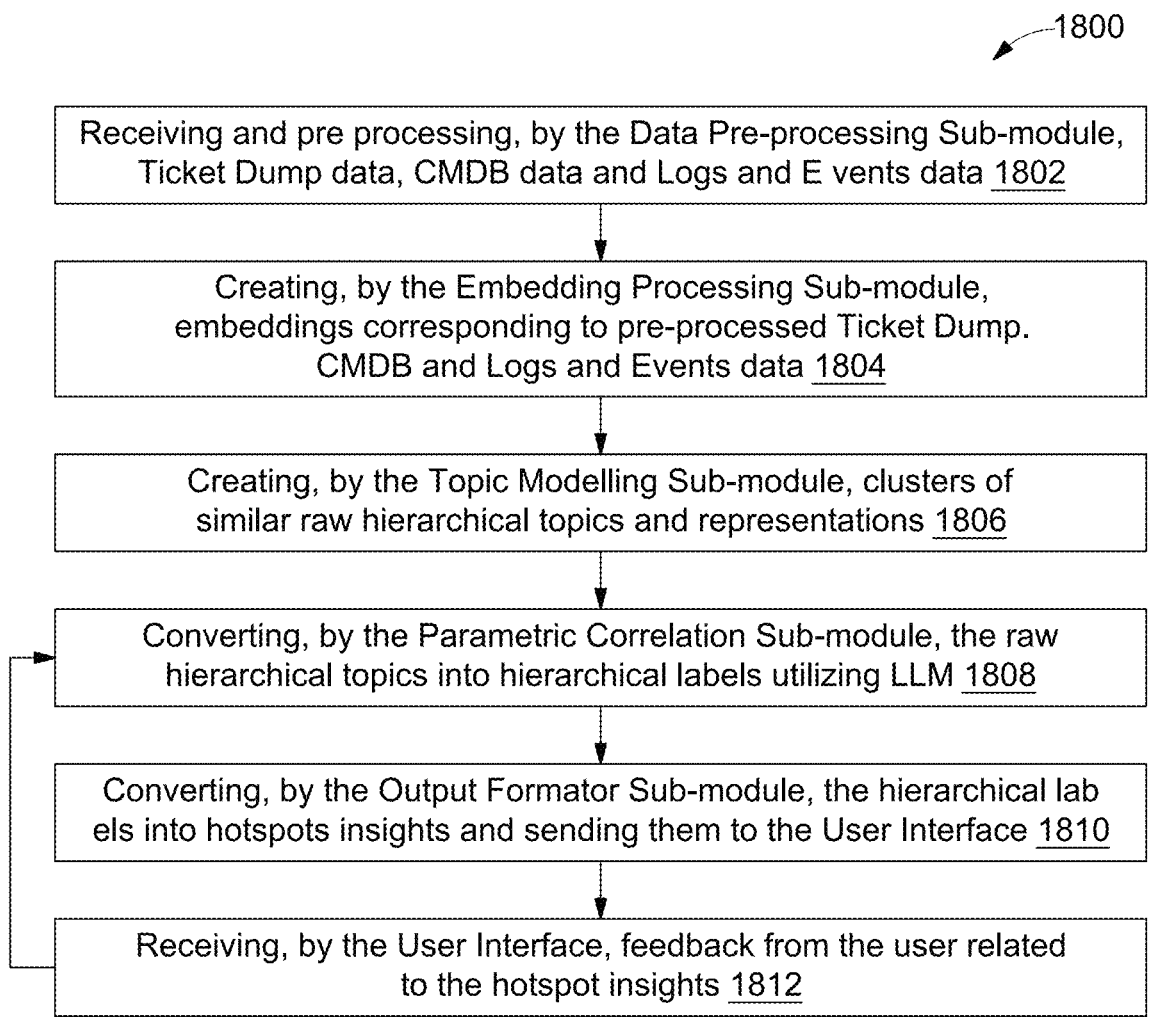
FIG. 18 illustrates a detailed exemplary process for identifying domain-specific service management hotspots, in accordance with an embodiment.

Referring now to FIG. 18, a flow diagram of a detailed exemplary process 1800 for identifying domain-specific service management hotspots is illustrated, in accordance with an embodiment. The process 1800 may be implemented by the hotspots identifying device 102 of the system 100. The process 1800 may include receiving and processing, by the data pre-processing sub module 210, raw data (i.e., the ticket dump 246, the CMDB data 248, and the logs and events data 250) from the first data storage 232, the second data storage 234, and the third data storage 236, respectively, to obtain the pre-processed data, at step 1802. The ticket dump data 246 has already been explained in greater detail in conjunction with FIG. 5 and FIG. 6. Further, the CMDB data 248 has already been explained in greater detail in conjunction with FIG. 7 and FIG. 8.

The logs and events data 250 is generated through logging. Logging is a process to keep a log of events that occur in software platform, such as warning, errors or just information on current operations. Logs may help to identify the source of the problem while creating Hotspot assigning weight to hotspot. By way of an example, the logs and events data 250 is presented below.

2024-05-14 14:05:09,788 [INFO] [User Access]: admin
2024-05-14 14:05:12,305 [INFO] [User Access]: admin
2024-05-14 14:05:24,223 [INFO] Use pytorch device: cpu
2024-05-14 14:06:54,930 [INFO] encoding: −3.0994415283203125e-06 secs
2024-05-14 14:06:55,385 [INFO] encoding: −0.45534658432006836 secs
2024-05-14 14:23:52,523 [ERROR] [User]: installation error while installing application Maya
2024-05-14 14:33:30,276 [ERROR] [User]: Network storage retrieval error
2024-05-14 14:35:12,069 [INFO] umap: −1697.139309167862 secs
2024-05-14 14:35:14,635 [INFO] hdbscan: −1699.704859495163 secs
2024-05-14 14:35:15,893 [INFO] Use pytorch device: cpu
2024-05-14 14:35:16,077 [INFO] representation: −1701.1470122337341 secs
2024-05-14 14:35:16,077 [INFO] topic: −1701.1475608348846 secs
2024-05-14 14:35:17,853 [INFO] HTTP Request: POST https://causalanalysis.openai.azure.com//openai/deployments/gpt-35-16k/chat/completions?api-version=2023-05-15 "HTTP/1.1 200 OK"
2024-05-14 16:40:32,244 [ERROR] [User]: storage access denied and application crash
2024-05-14 16:40:38,913 [INFO] Use pytorch device: cpu
2024-05-14 16:41:23,341 [INFO] encoding: −3.814697265625e-06 secs
2024-05-14 16:41:23,475 [INFO] encoding: −0.13470149040222168 secs
2024-05-14 16:59:18,348 [INFO] umap: −1075.0070374011993 secs
2024-05-14 16:59:19,648 [INFO] hdbscan: −1076.3072302341461 secs
2024-05-14 16:59:19,895 [ERROR] [User]: storage allocation issue
2024-05-14 16:59:19,899 [INFO] representation: −1076.5586414337158 secs
2024-05-14 16:59:19,900 [INFO] topic: −1076.5592484474182 secs
2024-05-14 16:59:20,741 [INFO] HTTP Request: POST https://causalanalysis.openai.azure.com//openai/deployments/gpt-35-16k/chat/completions?api-version=2023-05-15 "HTTP/1.1 200 OK"
2024-05-14 16:59:21,062 [INFO] HTTP Request: POST https://causalanalysis.openai.azure.com//openai/deployments/gpt-35-16k/chat/completions?api-version=2023-05-15 "HTTP/1.1 200 OK"
2024-05-14 16:59:21,316 [INFO] HTTP Request: POST https://causalanalysis.openai.azure.com//openai/deployments/gpt-35-16k/chat/completions?api-version=2023-05-15 "HTTP/1.1 200 OK"
2024-05-14 16:59:21,559 [INFO] HTTP Request: POST https://causalanalysis.openai.azure.com//openai/deployments/gpt-35-16k/chat/completions?api-version=2023-05-15 "HTTP/1.1 200 OK"
2024-05-14 16:59:21,774 [INFO] HTTP Request: POST https://causalanalysis.openai.azure.com//openai/deployments/gpt-35-16k/chat/completions?api-version=2023-05-15 "HTTP/1.1 200 OK"

Further, upon receiving the ticket dump data 246 and the CMDB data 248, the data pre-processing sub-module 210 may pre-process the raw data through the data preparation and cleaning unit 216 and the PII removal unit 218 to obtain the pre-processed data. The raw data (i.e., the ticket dump data 246, the CMDB data 248, and the logs and events data 250) may be in text format except the images present in the description of the ticket dump 246. The data preparation and cleaning unit 216 may convert the images into text utilizing techniques known in art like Optical Character Recognition (OCR) or multimodal LLMs for example, GPT4, Gemini, and the like. Further, the data preparation and cleaning unit 216 may eliminate any errors, inconsistencies, duplicates, or missing values in the text data of the pre-processed data. For example, spelling errors, punctuation mistakes, abbreviations, colloquialism, or typing errors may be corrected or standardized using dictionaries, rules, or spell-checkers. In IT field, teams use many abbreviations, for instance, data centers can be represented in line with the location, such as EDC for Europe Data Centers, IDC for India Data Centers, etc. Sometimes, the abbreviations might be confusing, and algorithms might not be able to analyze them correctly. So, these abbreviations are replaced with their full forms. The abbreviations may be replaced with their full forms. To replace the abbreviations to their full forms, any known automated mechanism may be used (for example, mapping with a pre-defined database). Alternatively, a file (manually created) containing mapping of the abbreviations along with the expansions may be used resulting in improved accuracy. The ticket dump data 246 and the CMDB data 248 with missing mandatory fields may be removed.

The PII data may be any data that can be used to identify a specific individual. For example, the PII data may include names, addresses, phone numbers, email addresses, etc. PII may be removed from the raw data to protect the privacy and security of the customers and employees who submitted the tickets. The exposed PII may lead to identity theft, fraud, or other harms. Therefore, it is important to comply with the data protection laws and regulations that govern the use and handling of PII. A combination of rule-based and machine learning methods may be used to detect and mask PII from the pre-processed data.

In an embodiment, pseudonymization method with mapping to artificial identifiers may be utilized. Pseudonymization is the process of replacing the data elements that may be used to identify an individual with artificial identifiers, such as codes, tokens, or placeholders. Pseudonymization may preserve the linkage between the data and the individual. At the same time, pseudonymization may require a secure mechanism to store and manage the mapping between the original and the pseudonymized data. Pseudonymization method may identify the PII field. Upon identifying the PII field, the pseudonymization method may replace the PII fields with placeholders. By way of an example, username may be replaced with "[User_11]", server name may be replaced with "[Server_365]". The mapping between the PII fields and the placeholders may be stored in the PII mapping database 252. After analysis, the "User_11, Server_365" may be remapped to the original data to locate the issue causing IT infrastructure elements and the impacted users. Further, the output formator sub-module 230 may utilize the PII mapping database 252 to remap the placeholders to the original PII fields. The pseudonymization method may lead to preserve the structure and the meaning of the sentences without revealing any sensitive information. The PII information not influencing the results (for example, phone numbers) may be removed completely. The data pre-processing may enhance the quality and usability of the data. The data pre-processing may further reduce the computational complexity and runtime of the algorithms. Further, the data pre-processing may further improve accuracy and performance.

Further, the process 1800 may include creating, by the embedding processing sub-module 212, the plurality of embeddings corresponding to pre-processed data, at step 1804. The plurality of embeddings may be stored in fifth data storage 240. The step 1804 may include transforming, by the embedding processing sub-module 212, the raw text data corresponding to the pre-processed data into numerical vectors (plurality of embeddings). The plurality of embeddings may be used by topic modelling machine learning algorithms. The plurality of embeddings may be created by the embedding creation unit 222 from chunked and tokenized data obtained by chunking and tokenizing the pre-processed data by the chunking and tokenizing unit 220.

Further, the process 1800 may include creating, by the topic modelling sub module 214, clusters of similar raw hierarchical topics and subtopics (i.e., the set of clusters and the associated sets of sub-clusters), at step 1806. The topic modelling sub module 214 may identify the topics from the plurality of embeddings corresponding to the pre-processed data. The clusters are created by the clustering unit 226.

The dimensionality reduction unit 224 may reduce the number of features or variables in a data set, while preserving the essential information and structure by dimensionality reduction technique. The plurality of embeddings corresponding to the pre-processed data may be high dimensional data (i.e., data with many features or variables that describe each observation or instance). The plurality of embeddings may capture the underlying patterns, noise and outliers. The high-dimensional data may require more resources and time to process, store, and analyze. The dimensionality reduction technique may reduce the number of features or variables in the plurality of embeddings corresponding to the pre-processed data. Further, the dimensionality reduction technique may preserve the essential information and structure.

In an embodiment, the Uniform Manifold Approximation and Projection (UMAP) technique may reduce the dimension of embeddings corresponding to the pre-processed data. The IT infrastructure issues may be hierarchical in nature. By the way of an example, the VDI issue may be the main topic. The sub-topics corresponding to the VDI issues may be connectivity issue, performance issue, configuration issue, authentication issue etc. Additionally, the data center components may be organized in topological order. By the way of an example, but may not be limited to, UMAP technology may be the best fit for representing results in hierarchical structure. Customization of UMAP for the topic modeling for IT infrastructure the pre-processed data may be used. The matrix of the plurality of embeddings may include the semantic similarity between the features. The data format may help to improve the solution results.

To control the behavior and output of the UMAP algorithm, hyperparameters may be set, such as the number of neighbors (n_neighbors), the minimum distance (min_dist), the metric (metric), and the number of components (n_components). Selection of parameters may be made by an expert considering the characteristics of the embeddings to suit the IT infrastructure based on multiple experiments and considering the output of the next step i.e. clustering by looking at the number of topics or clusters in the IT infrastructure data. For example, to preserve the local structure of the embeddings related to data center (IT infrastructure) or applications, n_neighbors are set to a high value and min_dist is set to a low value. For metric, 'cosine' methodology is used. The number of components (n_components) hyperparameter is set to a larger value.

Further, the clustering may depend on the quality of the dimensionality reduced data. A larger and denser data set may require a larger n_neighbors value to capture the global structure, while a smaller and sparser data set may require a smaller n_neighbors value to avoid noise and outliers. Similarly, a larger and denser data set may require a smaller min_dist value to separate the clusters, while a smaller and sparser data set may require a larger min_dist value to avoid fragmentation and isolation. Further, the dimensionality reduction unit 224 may send the embeddings with reduced dimensions corresponding to the pre-processed data and logs and events data 250 to the clustering unit 226.

The clustering unit 226 may group the groups the documents or terms into clusters based on their similarity. The similarity may be measured by various metrics (for example, cosine similarity, Jaccard similarity, or Euclidean distance). Clustering may help to discover the topics or themes in the plurality of embeddings with reduced dimensions corresponding to the pre-processed data. In an embodiment, a DBScan (Density-Based Spatial Clustering of Applications with Noise) algorithm may be used for clustering. The DBScan algorithm may identify clusters of arbitrary shape and size. The DBScan algorithm may further detect outliers or noise points that do not belong to any cluster. The DBScan algorithm may use epsilon and min_samples as the two parameters to create clusters. Epsilon is the maximum distance between two points to be considered as neighbors. Min_samples is the minimum number of points to form a dense region or cluster. Further, the DBScan algorithm may detect clusters based on the density of the points i.e. the points that are close together are more likely to belong to the same cluster, while points that are far apart are more likely to be outliers. The DBScan may capture the complex and diverse topics in the data and filters out irrelevant or noisy terms or documents. The noisy terms or documents do not contribute to the topic coherence or quality. The DBScan algorithm may handle large and high-dimensional data sets efficiently and may be robust to noise and outliers.

The input to the clustering unit 226 may include issues representatives from different sources, such as service desk incidents, user request tickets, system generated events and process logs. The input of higher weightages may be assigned to the fields of the Ticket Dump like Priority and Impact so that the sources that are more relevant or urgent (such as incidents and events) get the priority leading to improved quality and coherence of the clusters and reduce the noise and outliers that may come from less important or less reliable sources. The IT Infrastructure setups may be deployed in hierarchical way. The hierarchical structure may help to capture the different levels of abstraction and granularity in the data. Further, the hierarchical structure may provide more informative and interpretable results. By the way of an example, if the data contains issue representatives from different IT infrastructure services, such as network, storage, database, or application, a hierarchical topic model can group them into coherent sub-topics and super-topics, such as network connectivity, network security, network performance, etc. This may help to identify the root causes and impacts of the issues, and prioritize the actions and resources needed to resolve them.

The DBScan may leverage the all-MiniLM model as the base model for clustering. The MiniLM model may be trained on generic English language. The MiniLM model may treat all data equally. The MiniLM model should be made IT infrastructure domain aware. Seed words may be input to the MiniLM model to make sure that domain specific words are weighted higher and are more often used in topic representations. Further, an IT infrastructure domain vocabulary may be created. The IT infrastructure domain vocabulary may be provided as input to the MiniLM model as seed words. The seed words may be prepared using large corpus of IT-related documents, such as technical manuals, tutorials, blogs, forums, and wikis which capture the domain-specific vocabulary, concepts, and relations of the IT infrastructure services. The DBScan algorithm may fine tune the MiniLM model with the seed data. Upon fine-tuning the model, the topic modeling sub-module 214 may generate more accurate and relevant topics and sub-topics that reflect the real-world problems, solutions, and dependencies of the IT infrastructure services.

Referring back to FIG. 18, the process 1800 may include converting, by the parameteric correlation sub-module 228, the raw hierarchical topics into the hierarchical labels utilizing LLM, at step 1808. The parametric correlation sub-module 228 may receive the table containing details of the set of clusters (topics), the set of sub-clusters (sub-topics), count (occurrence of the issue) and the affected CMDB servers (servers that are affected from the issues) from the clustering unit 226. Upon receiving the details of the table, the parametric correlation sub-module 228 may convert the hierarchical set of clusters and the set of sub-clusters into hierarchical labels utilizing LLM. Further, the parametric correlation sub-module 228 may create a new table (i.e., a labelled table) with the details like the set of cluster labels, the set of sub-cluster labels, count (occurrence of the issue) and the affected CMDB servers (servers that are affected from the issues). Further, the parametric correlation sub-module 228 may send the details of the new table to the output formator sub-module 230.

The parametric correlation sub-module 228 may receive the table containing details of the set of clusters (topics), the set of sub-clusters (sub-topics), count (occurrence of the issue), and the affected CMDB servers (servers that are affected from the issues). The parametric correlation sub-module 228 may send the table to the LLM unit 242. It may be noted that the parametric correlation sub-module 228 may send the instructions in the form of prompt to map the topics and sub-topics to the labels corresponding to both topics and sub-topics. Further, the LLM unit 242 may leverage the LLMs such as GPT or Gemini to generate natural and conversational labels for the topics and sub-topics. LLMs may help to create labels that are more engaging, personalized, and user-friendly, and that can adapt to different contexts and scenarios. The parametric correlation sub-module 228 may create and prepare the prompt incorporating the hierarchical clusters and sub-clusters along with the instructions with few shots' examples.

By the way of an example, the typical prompt is given below.

"Prompt=
[
  }
    "role": "system",
    "content": "You are an experienced IT Infrastructure analyst."
  },
  {
    "role": "user",
    "content":"
The raw topics identified by clustering algorithm are as below
  {<topic> <sub-topic>, . . . }
  Based on the information above, extract a short topic label (should not be more than 3 words) which depicts the root cause of the incident.
  Within each topic, extract a short subtopic labels (should not be more than 7 words)
  Provide labels in the following format:
  topic_label: <topic label>
  subtopic_label: <sub-topic label>
  Make sure to make topic labels generic that provide high level view and sub-topic labels are specific and linked to topic. Examples: problems with network in VDI such as slow speed, slow mouse movement, timeout failures, disconnects can be labelled as VDI_Network_Issue.
"
  }
]

In continuation of the example, the parametric correlation sub-module 228 may send the prompt to the LLM unit 242. Further, the LLM unit 242 may transform the hierarchical clusters and sub-clusters into labels utilizing the LLM 256 based on the instructions and few shots provided in the prompt and provide these labels in the form of a table containing the set of cluster labels corresponding to the set of clusters and the set of sub-cluster labels corresponding to the set of sub-clusters to the parametric correlation sub-module 228.

The process 1800 may include converting, by the output formator sub-module 230, the hierarchical labels into hotspots insights and sending them to the User Interface 258, at step 1808. The output formator sub-module 230 may receive the table containing details like labels corresponding to the clusters and sub-clusters, and the details like count (occurrence of the issue) and the affected CMDB servers (servers that are affected from the issues) from the parametric correlation sub-module 228. The output formator sub-module 230 may convert the labels corresponding to the clusters and sub-clusters into the hierarchical representation required for the visualization map. The output formator sub-module 230 may further build mind map visualization map. The visualization map may be presented to the user through the User Interface 258.

The visualization map (i.e., a mind-map representation) may provide easy understandable and comprehensive insights from the issues (or hotspots). A plurality of libraries may be available for visualization of the hierarchical structure such as D3, ploty, and uml. Additionally, the output formator sub-module 230 may fetch the mapping between the PII fields and placeholders for the PII fields from the fourth data storage 238. The output formator sub-module 230 may further remap the placeholders to corresponding PII fields like original server names and user names.

Further, the process 1800 may include receiving, by the user interface 258, feedback from the user related to the hotspots, at step 1812. The user Interface 258 may receive the visualization map. Upon receiving the visualization feed, the user interface 258 may present the visualization map to the user. The user may provide feedback comments on the labels through the various UI elements (for example, text box, buttons, icons, and the like). By way of an example, the user may mention in the feedback if the particular label may not be accurate, new label may be added, etc.

Further, the user interface 258 may send the feedback to the parametric correlation sub-module 228. The parametric correlation sub-module 228 may send the feedback to the LLM unit 242. Further, the parametric correlation sub-module 228 may correct the labels.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 19:
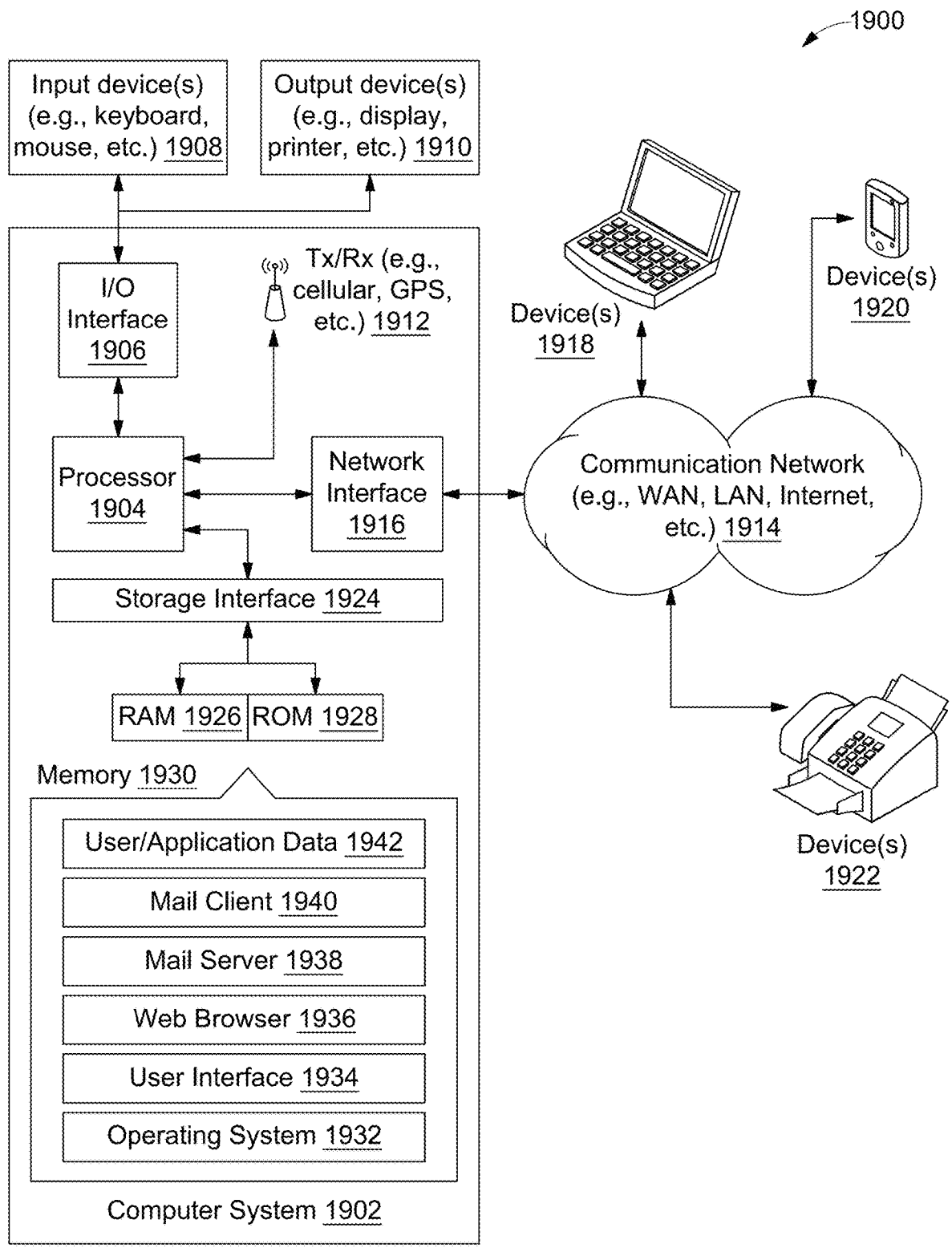
FIG. 19 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 19, an exemplary computing system 1900 that may be employed to implement processing functionality for various embodiments (e.g., as a SIMD device, client device, server device, one or more processors, or the like) is illustrated. Variations of computer system 1902 may be used for implementing system 100 for identifying domain-specific service management hotspots. Computer system 1902 may include a central processing unit ("CPU" or "processor") 1904. Processor 1904 may include at least one data processor for executing program components for executing user-generated or system-generated requests. A user may include a person, a person using a device such as such as those included in this disclosure, or such a device itself. The processor 1904 may include specialized processing units such as integrated system (bus) controllers, memory management control units, floating point units, graphics processing units, digital signal processing units, etc. The processor 1904 may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 1904 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc Processor 1904 may be disposed in communication with one or more input/output (I/O) devices via I/O interface 1906. The I/O interface 1906 may employ communication protocols/methods such as, without limitation, audio, analog, digital, monoaural, RCA, stereo, IEEE-1394, near field communication (NFC), FireWire®, Camera Link®, GigE®, serial bus, universal serial bus (USB), infrared, PS/2, BNC, coaxial, component, composite, digital visual interface (DVI), high-definition multimedia interface (HDMI®), radio frequency (RF) antennas, S-Video, video graphics Array® (VGA), IEEE® 802.n/b/g/n/x, Bluetooth®, cellular (e.g., code-division multiple access (CDMA), high-speed packet access (HSPA+), global system for mobile communications (GSM®), long-term evolution (LTE®), WiMAX®, or the like), etc., Using the I/O interface 1906, the computer system 1902 may communicate with one or more I/O devices. For example, the input device 1908 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1910 may be a printer, fax machine, video display (e.g., cathode ray tube (CRT), liquid crystal display (LCD), light-emitting diode (LED), plasma, or the like), audio speaker, etc. In some embodiments, a transceiver 1912 may be disposed in connection with the processor 1904. The transceiver 1912 may facilitate various types of wireless transmission or reception. For example, the transceiver 1912 may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800@ transceiver, or the like), providing IEEE 802.11a/b/g/n, Bluetooth, FM, global positioning system (GPS), 2G/3G HSDPA/HSUPA communications, etc.

In some embodiments, the processor 1904 may be disposed in communication with a communication network 1916 via a network interface 1914. The network interface 1914 may communicate with the communication network 1916. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1916 may include, without limitation, a direct interconnection, local area network (LAN), wide area network (WAN), wireless network (e.g., using Wireless Application Protocol), the Internet, etc. Using the network interface 1914 and the communication network 1916, the computer system 1902 may communicate with devices 1918, 1920, and 1922. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX® NINTENDO® DS®, SONY PLAYSTATION®, etc.), or the like. In some embodiments, the computer system 1902 may itself embody one or more of these devices.

In some embodiments, the processor 1904 may be disposed in communication with one or more memory devices (e.g., RAM 1926, ROM 1928, etc.) via a storage interface 1924. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 1932, user interface application 1934, web browser 1936, mail server 1938, mail client 1940, user/application data 1942 (e.g., any data variables or data records discussed in this disclosure), etc. The operating system 1932 may facilitate resource management and operation of the computer system 1902. Examples of operating systems include, without limitation, APPLE MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 1934 may facilitate display, execution, interaction, manipulation, or operation of program components through textual or graphical facilities. For example, user interfaces may provide computer interaction interface elements on a display system operatively connected to the computer system 1902, such as cursors, icons, check boxes, menus, scrollers, windows, widgets, etc. Graphical user interfaces (GUIs) may be employed, including, without limitation, APPLE MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 1902 may implement a web browser 1936 stored program component. The web browser may be a hypertext viewing application, such as MICROSOFT® INTERNET EXPLORER®, GOOGLE CHROME®, MOZILLA FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 1902 may implement a mail server 1938 stored program component. The mail server may be an Internet mail server such as MICROSOFT® EXCHANGE®, or the like. The mail server 1938 may utilize facilities such as ASP, ActiveX, ANSI C++/C#, MICROSOFT.NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 1902 may implement a mail client 1940 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 1902 may store user/application data 1942, such as the data, variables, records, etc. (e.g., ticket dump data, CMDB data, logs and events data, chunked data, plurality of tokens, plurality of embeddings, set of chunking and tokenizing algorithms data, cluster data, sub-cluster data, labels data, visualization map data, LLM data, and so forth) as described in this disclosure. Such databases may be implemented as fault-tolerant, relational, scalable, secure databases such as ORACLE® or SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of identifying domain-specific service management hotspots. The disclosed method and system may receive raw data corresponding to a plurality of domain-specific issues. The raw data comprises at least one of image data and text data. Further, the disclosed method and system may generate a plurality of chunks from the raw data using an optimal chunking and tokenizing algorithm selected from a set of chunking and tokenizing algorithms to obtain chunked data. Further, the disclosed method and system may create a plurality of embeddings from the chunked data through an embedding model. Further, the disclosed method and system may cluster the plurality of embeddings into a set of clusters and a set of sub-clusters associated with each of the set of clusters, based on a similarity analysis. Further, the disclosed method and system may determine a set of cluster labels corresponding to the set of clusters and a set of sub-cluster labels corresponding to the set of sub-clusters associated with each of the set of clusters, via a LLM. The set of cluster labels and the set of sub-cluster labels are in natural language. Further, the disclosed method and system may identify a plurality of hotspots corresponding to the plurality of domain-specific issues based on the set of cluster labels and the set of sub-cluster labels.

As will be appreciated by those skilled in the art, the techniques described in the various embodiments discussed above are not routine, or conventional, or well understood in the art. The techniques may improve the accuracy by using CMDB data and logs and events data, the techniques may leverage the information from the service maps to improve the accuracy of the topic modelling. The techniques may further improve the interpretability and usefulness of the insights by linking the issue to the specific components that affected the issues. The techniques may further suggest actions that may resolve the issues. The techniques may further prioritize the actions based on the severity, urgency, and frequency of the issues. Further, the techniques may generate actionable insights for IT team. The technique may further identify the key drivers and the root causes of issues, such as misconfiguration, outdated software, insufficient resources, or external factors. The techniques may further evaluate the IT system architecture and design. The techniques may identify the strengths, weaknesses, opportunities, and threats, such as the performance, scalability, security, availability, usability, or maintainability of the IT system, the compliance, alignment, or compatibility of the IT system, gaps in the IT system implementation, deployment, or evolution.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system identifying domain-specific service management hotspots. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of identifying domain-specific service management hotspots, the method comprising:
   receiving, by a causal analysis server, raw data corresponding to a plurality of domain-specific issues, wherein the raw data comprises at least one of image data and text data;
   generating, by the causal analysis server, a plurality of chunks from the raw data using an optimal chunking and tokenizing algorithm selected from a set of chunking and tokenizing algorithms to obtain chunked data;
   creating, by the causal analysis server, a plurality of embeddings from the chunked data through an embedding model;
   clustering, by the causal analysis server, the plurality of embeddings into a set of clusters and a set of sub-clusters associated with each of the set of clusters, based on a similarity analysis;
   determining, by the causal analysis server, a set of cluster labels corresponding to the set of clusters and a set of sub-cluster labels corresponding to the set of sub-clusters associated with each of the set of clusters, via a Large Language Model (LLM), wherein the set of cluster labels and the set of sub-cluster labels are in natural language;
   identifying, by the causal analysis server, a plurality of hotspots corresponding to the plurality of domain-specific issues based on the set of cluster labels and the set of sub-cluster labels;
   receiving, by a Graphical User Interface (GUI), a user feedback corresponding to one or more of the set of cluster labels or one or more of the set of sub-cluster labels corresponding to each of the set of cluster labels;
   creating a prompt based on the user feedback;
   inputting the prompt to the LLM; and
   for each label of the one or more of the set of cluster labels or one or more of the set of sub-cluster labels corresponding to each of the set of cluster labels, generating, by the LLM, an updated label based on the prompt.

2. The method of claim 1, further comprising:
   pre-processing the raw data using one or more pre-processing techniques, wherein the pre-processing comprises:
      when the raw data comprises the image data, obtaining extracted text data from the image data through a text extraction technique;
      performing data cleaning on the text data of the raw data and the extracted text data; and removing Personally Identifiable Information (PII) data from the text data and the extracted text data.

3. The method of claim 1, further comprising:
for each chunking and tokenizing algorithm of the set of chunking and tokenizing algorithms,
generating a preliminary plurality of chunks from the raw data through the chunking and tokenizing algorithm, wherein each of the set of chunking and tokenizing algorithms is configured with a set of parameters;
generating a preliminary plurality of tokens from the preliminary plurality of chunks through the chunking and tokenizing algorithm; and
evaluating the preliminary plurality of tokens based on a cosine similarity score variance; and
selecting the optimal chunking and tokenizing algorithm from the set of chunking and tokenizing algorithms based on evaluation of the preliminary plurality of tokens, wherein the plurality of chunks is the preliminary plurality of chunks generated by the optimal chunking and tokenizing algorithm.

4. The method of claim 1, wherein creating the plurality of embeddings from the chunked data comprises:
receiving the plurality of chunks generated by the optimal chunking and tokenizing algorithm;
generating a plurality of tokens from the plurality of chunks through the optimal chunking and tokenizing algorithm;
creating the plurality of embeddings from the plurality of tokens through the embedding model; and
reducing dimensions of the plurality of embeddings through a dimensionality reduction algorithm preconfigured with a set of customized hyperparameters.

5. The method of claim 1, wherein the similarity analysis comprises:
calculating a similarity score corresponding to the plurality of embeddings; and
based on the similarity score, grouping one or more of the plurality of embeddings into one of:
a cluster of the set of clusters, or
a sub-cluster of the set of sub-clusters associated with each of the set of clusters.

6. The method of claim 1, wherein determining the set of cluster labels and the set of sub-cluster labels comprises:
creating a prompt based on the set of clusters and the set of sub-clusters associated with each of the set of clusters;
inputting the prompt to the LLM, wherein the LLM is a fine-tuned LLM specific to a domain of the plurality of domain-specific issues; and
generating, using the LLM, the set of cluster labels corresponding to the set of clusters and the set of sub-cluster labels corresponding to the set of sub-clusters based on the prompt.

7. The method of claim 1, wherein the raw data comprises at least one of ticket dump data, Configuration Management Database (CMDB) data, and logs and events data.

8. The method of claim 7, further comprising:
identifying one or more affected servers corresponding to each of the set of sub-clusters using the CMDB data; and
determining a count corresponding to each of the set of sub-clusters using the ticket dump data.

9. The method of claim 8, further comprising:
rendering, using the GUI, a visualization map based on the set of cluster labels and the set of sub-cluster labels, the one or more affected servers, and the count.

10. A causal analysis server for identifying domain-specific service management hotspots, the system comprising:
a processor; and
a memory communicatively coupled to the processor, wherein the memory stores processor instructions, which when executed by the processor, cause the processor to:
receive raw data corresponding to a plurality of domain-specific issues, wherein the raw data comprises at least one of image data and text data;
generate a plurality of chunks from the raw data using an optimal chunking and tokenizing algorithm selected from a set of chunking and tokenizing algorithms to obtain chunked data;
create a plurality of embeddings from the chunked data through an embedding model;
cluster the plurality of embeddings into a set of clusters and a set of sub-clusters associated with each of the set of clusters, based on a similarity analysis;
determine a set of cluster labels corresponding to the set of clusters and a set of sub-cluster labels corresponding to the set of sub-clusters associated with each of the set of clusters, via a Large Language Model (LLM), wherein the set of cluster labels and the set of sub-cluster labels are in natural language;
identify a plurality of hotspots corresponding to the plurality of domain-specific issues based on the set of cluster labels and the set of sub-cluster labels;
receive, by a Graphical User Interface (GUI), a user feedback corresponding to one or more of the set of cluster labels or one or more of the set of sub-cluster labels corresponding to each of the set of cluster labels;
create a prompt based on the user feedback;
input the prompt to the LLM; and
for each label of the one or more of the set of cluster labels or one or more of the set of sub-cluster labels corresponding to each of the set of cluster labels, generate, by the LLM, an updated label based on the prompt.

11. The causal analysis server of claim 10, wherein the processor instructions, on execution, further cause the processor to:
pre-process the raw data using one or more pre-processing techniques, wherein for pre-processing, the processor is configured to:
when the raw data comprises the image data, obtain extracted text data from the image data through a text extraction technique;
perform data cleaning on the text data of the raw data and the extracted text data; and
remove Personally Identifiable Information (PII) data from the text data and the extracted text data.

12. The causal analysis server of claim 10, wherein the processor instructions, on execution, further cause the processor to:
for each chunking and tokenizing algorithm of the set of chunking and tokenizing algorithms,
generate a preliminary plurality of chunks from the raw data through the chunking and tokenizing algorithm, wherein each of the set of chunking and tokenizing algorithms is configured with a set of parameters;
generate a preliminary plurality of tokens from the preliminary plurality of chunks through the chunking and tokenizing algorithm; and evaluate the preliminary plurality of tokens based on a cosine similarity score variance; and select the optimal chunking and tokenizing algorithm from the set of chunking and tokenizing algorithms based on evaluation of the preliminary plurality of tokens, wherein the plurality of chunks is the preliminary plurality of chunks generated by the optimal chunking and tokenizing algorithm.

13. The causal analysis server of claim 12, wherein to create the plurality of embeddings from the chunked data, the processor instructions, on execution, further cause the processor to:

receive the plurality of chunks generated by the optimal chunking and tokenizing algorithm;

generate a plurality of tokens from the plurality of chunks through the optimal chunking and tokenizing algorithm;

create the plurality of embeddings from the plurality of tokens through the embedding model; and reduce dimensions of the plurality of embeddings through a dimensionality reduction algorithm preconfigured with a set of customized hyperparameters.

14. The causal analysis server of claim 10, wherein for similarity analysis the processor instructions, on execution, further cause the processor to:

calculate a similarity score corresponding to the plurality of embeddings; and based on the similarity score, group one or more of the plurality of embeddings into one of:
 a cluster of the set of clusters, or
 a sub-cluster of the set of sub-clusters associated with each of the set of clusters.

15. The causal analysis server of claim 10, wherein to determine the set of cluster labels and the set of sub-cluster labels the processor instructions, on execution, further cause the processor to:

create a prompt based on the set of clusters and the set of sub-clusters associated with each of the set of clusters;

input the prompt to the LLM, wherein the LLM is a fine-tuned LLM specific to a domain of the plurality of domain-specific issues; and generate, using the LLM, the set of cluster labels corresponding to the set of clusters and the set of sub-cluster labels corresponding to the set of sub-clusters based on the prompt.

16. The causal analysis server of claim 10, wherein the raw data comprises at least one of ticket dump data, Configuration Management Database (CMDB) data, and logs and events data.

17. The causal analysis server of claim 16, wherein the processor instructions, on execution, further cause the processor to:

identify one or more affected servers corresponding to each of the set of sub-clusters using the CMDB data; and determine a count corresponding to each of the set of sub-clusters using the ticket dump data.

18. The causal analysis server of claim 17, wherein the processor instructions, on execution, further cause the processor to:

render, using the GUI, a visualization map based on the set of cluster labels and the set of sub-cluster labels, the one or more affected servers, and the count.

* * * * *